US008828475B2

(12) United States Patent
Shionoiri et al.

(10) Patent No.: US 8,828,475 B2

(45) Date of Patent: Sep. 9, 2014

(54) IMAGE FORMING METHOD

(75) Inventors: Momoko Shionoiri, Tokyo (JP); Toshiyuki Kabata, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 638 days.

(21) Appl. No.: 12/862,151

(22) Filed: Aug. 24, 2010

(65) Prior Publication Data

US 2011/0052928 A1 Mar. 3, 2011

(30) Foreign Application Priority Data

Aug. 26, 2009 (JP) ................................ 2009-195225
Nov. 2, 2009 (JP) ................................ 2009-251896
Jul. 6, 2010 (JP) ................................ 2010-153978

(51) Int. Cl.
*B32B 27/00* (2006.01)
*G03G 15/16* (2006.01)

(52) U.S. Cl.
CPC .................................. *G03G 15/1605* (2013.01)
USPC ................ 427/8; 399/296; 399/302; 399/308

(58) Field of Classification Search
USPC .............................. 427/8; 399/302, 308, 296
See application file for complete search history.

(56) References Cited

U.S. PATENT DOCUMENTS 5,510,886 A * 4/1996 Sugimoto et al. ............. 399/308
6,643,487 B1 * 11/2003 Shimmura .................... 399/302
2007/0025740 A1 * 2/2007 Katoh et al. ...................... 399/1
2007/0123435 A1 * 5/2007 Usami ........................... 508/100
2010/0196062 A1 8/2010 Kozasa et al.

FOREIGN PATENT DOCUMENTS

JP 3210191 7/2001
JP 2004-198662 7/2004
JP 2004-361694 12/2004
JP 2005-4051 1/2005
JP 2005-249901 9/2005
JP 2005-316231 11/2005
JP 3753909 12/2005
JP 4401694 11/2009

* cited by examiner

*Primary Examiner* — Timothy Meeks
*Assistant Examiner* — Nathan T Leong
(74) *Attorney, Agent, or Firm* — Cooper & Dunham LLP

(57) ABSTRACT

An image forming method which applies a zinc-containing metal soap to a surface of an intermediate transfer belt including nitrogen on its surface. At least one of the following formulae is satisfied:

$$(1-C/D)\times100(\%)-(B/A)\times100(\%)\leq10(\%)$$

$$(F/E)\times100(\%)\leq30(\%)$$

wherein A and B represent a percentage content of nitrogen at the surface of the intermediate transfer belt before and after image formation on 1,000 sheets, respectively, C represents a percentage content of zinc at the surface of the intermediate transfer belt after the image formation on 1,000 sheets, D represents a percentage content of zinc based on all elements other than hydrogen in the zinc-containing metal soap, and E and F represent a percentage content of nitrogen at the surface of the intermediate transfer belt before and after application of the metal soap thereto for 5 minutes without image formation, respectively.

15 Claims, 3 Drawing Sheets

IMAGE FORMING METHOD

CROSS-REFERENCE TO RELATED APPLICATIONS

The present patent application claims priority pursuant to 35 U.S.C. §119 from Japanese Patent Application Nos. 2009-195225 and 2009-251896, filed on Aug. 26, 2009 and Nov. 2, 2009, respectively, each of which is hereby incorporated by reference herein in its entirety.

BACKGROUND

1. Field of the Invention

The present invention relates to an electrophotographic image forming method.

2. Description of the Background

In electrophotographic image forming apparatuses, seamless belts are used with various functions and uses, such as a paper conveyance belt.

Recently, seamless belts are also used as an intermediate transfer belt in full-color electrophotographic image forming apparatuses. The intermediate transfer belt is a member onto which four or more toner images of different colors are transferred from one or more photoreceptors to form a composite full-color toner image thereon. The composite full-color toner image is then transferred from the intermediate transfer belt onto a transfer medium such as paper.

Demands for intermediate transfer belt are growing in accordance with recent colorization of copiers. The intermediate transfer belt is generally comprised of materials such as thermoplastic resins, thermosetting resins, rubbers, and elastomers. The intermediate transfer belt is widely used in electrophotographic image forming apparatuses in which developing devices are arranged in tandem (hereinafter "tandem electrophotographic image forming apparatuses") for the purpose of increasing printing speed.

In the tandem electrophotographic image forming apparatus, the intermediate transfer belt is required not to deform through an image forming operation so as not to cause color drift in the composite full-color toner image. The intermediate transfer belt is also required to be strong and durable enough to withstand repeated use. Because the intermediate transfer belt is also required to be flame-resistant, polyimide resins and polyamide-imide resins have been preferably used therefor. In particular, polyimide resins are more advantageous from the viewpoint of creep deformation property, durability, and controllability of electric properties.

In operation, such intermediate transfer belts are susceptible to two phenomena, abrasion and filming. These are described below.

In an image forming operation, some toner particles may remain on the intermediate transfer belt after image transfer without being transferred onto a transfer medium. Therefore, it is necessary to remove such residual toner particles from the intermediate transfer belt. One of the most effective ways to remove residual toner particles from the intermediate transfer belt is to scrape the residual toner particles off by pressing an edge of a cleaning blade against the surface of the intermediate transfer belt.

On the other hand, the intermediate transfer belt is provided with electric properties, required when transferring toner images. However, the electric properties deteriorate with repeated image forming operations, because the cleaning blade is constantly pressed against the intermediate transfer belt. Thus, the lifespan of the intermediate transfer belt is shortened and eventually abnormal images are produced.

Moreover, in accordance with the widespread use of oilless fixing systems, recent toners typically include waxes and soft materials, which are easily softened, for the purpose of reducing fixable temperature to save energy. Such waxes and soft materials are likely to adhere to the intermediate transfer belt and to be gradually formed into a film with repeated image forming operation. This phenomenon is hereinafter referred to as filming. The electric properties of the intermediate transfer belt deteriorate due to the occurrence of filming.

Additionally, demand for forming images not only on typical copying paper but also on coated paper and printing paper that include large amounts of loading materials such as talc, kaolin, and calcium carbonate, is increasing. Such loading materials are likely to adhere to the intermediate transfer belt when images are transferred from the intermediate transfer belt onto such types of paper, and the adhered loading materials are likely to cause filming.

In attempting to suppress both the damage caused by pressure from the cleaning blade and the occurrence of filming caused by toner component materials and loading materials, one proposed approach involves reducing the surface friction coefficient of the intermediate transfer belt. For example, Japanese Patent Application Publication No. (hereinafter "JP-A") H08-95455 and Japanese Patent No. 3753909 each propose applying a metal soap (i.e., a lubricant) to the surface of an intermediate transfer belt to reduce the surface friction coefficient thereof.

An image forming apparatus in which a metal soap is applied to the intermediate transfer belt is able to form high quality images at low printing speeds. However, when the printing speed is high, as is consistent with recent demand, abnormal images with undesired stripes may be formed in continuous image forming operations. This is because a portion of the intermediate transfer belt on which an image exists has a higher surface friction coefficient than a portion on which no image exists, and therefore toner component materials and loading materials are selectively adhere to the portion having a higher surface friction coefficient on which an image exists. Thus, the electric properties of the portion to which toner component materials and loading materials are adhered deteriorate, resulting in production of abnormal images with undesired strips.

In attempting to apply a sufficient amount of a lubricant to an intermediate transfer belt, one proposed approach involves controlling a surface profile of the intermediate transfer belt. For example, JP-2005-316231-A and JP-2004-361694-A control the surface profile of an intermediate transfer belt by roughening its surface with an abrasive paper or an abrasive agent.

The inventors of the present invention attempted to optimize the surface profile of an intermediate transfer belt by referring to JP-2005-316231-A and JP-2004-361694-A. However, even in a case where a sufficient amount of a metal soap was adhered to the intermediate transfer belt, filming occurred in some portions on the intermediate transfer belt when images were formed at high speeds. Observation of this intermediate transfer belt using an electron microscope revealed that a portion where filming occurred had only a very small amount of the metal soap.

Accordingly, to form high quality images even when the printing speed is high, the metal soap is required to be applied to the whole surface of the intermediate transfer belt, which has never been achieved.

Zinc stearate is a widely-used metal soap as a lubricant for an intermediate transfer belt. It is well known that the coverage of zinc stearate on an intermediate transfer belt can be measured by X-ray photoelectron spectroscopy (XPS), as described in JP-2005-17469-A, JP-2005-249901-A, JP-2005-004051-A, and JP-2004-198662-A.

XPS detects all elements other than hydrogen, existing on the outermost surface of a sample. Consider a case where a photoreceptor to which zinc stearate is applied to its surface is measured by XPS. As the coverage of zinc stearate increases, the measured elemental composition approaches from that of the photoreceptor alone to that of zinc stearate alone. When the coverage of zinc stearate is 100%, the measured elemental composition becomes theoretically equivalent to that of zinc stearate, and the measured amount of zinc becomes saturated. Specifically, the saturation amount of zinc is 2.44% by atom, which is theoretically calculated from the elemental composition of zinc stearate. Thus, the coverage of zinc stearate can be measured from the following formula:

$$(Zn/2.44)\times 100$$

wherein Zn (% by atom) is the amount of Zn of the sample measured by XPS.

It is more advantageous to mix zinc stearate with a certain amount of zinc palmitate. Because zinc palmitate has a lower melting point than zinc stearate, the mixture of zinc stearate and zinc palmitate can be more easily spread over the intermediate transfer belt even when the linear speed is high.

However, the theoretical saturation amount of zinc, i.e., 2.44% by atom, which is theoretically calculated from the elemental composition of zinc stearate, cannot be used for calculation of the coverage of the mixture of zinc stearate and zinc palmitate. The theoretical saturation amount of zinc has to be recalculated for each mixing ratio of zinc stearate and zinc palmitate, which is less practical and economical, and more cumbersome.

To solve these problems, a method for calculating the coverage of the mixture of zinc stearate and zinc palmitate on the surface of an intermediate transfer belt, regardless of their mixing ratio, is herein proposed. This method is applicable to a case where any metal soap, not limited to the mixture of zinc stearate and zinc palmitate, is applied to an intermediate transfer belt including nitrogen on its surface. Specifically, this method calculates the coverage of a metal soap on an intermediate transfer belt from the rate of decrease in the percentage content of nitrogen at the surface of the intermediate transfer belt before and after applying the metal soap thereto. More specifically, the exposure rate of the intermediate transfer belt is calculated from the above rate of decrease in the percentage content of nitrogen at the surface of the intermediate transfer belt, and then the coverage of the metal soap is calculated from the following formula:

$$\text{Coverage}(\%)=100-\text{Exposure rate}(\%)$$

When the exposure rate thus calculated before any given image forming operation is 30% or less, more preferably 20% or less, and most preferably 10% or less, high quality images can be produced for an extended period of time.

However, even when the exposure rate thus calculated before any given image forming operation is 30% or less, blurred images are found to be produced under high-temperature and high-humidity conditions in some cases. As a result of detailed analysis of these cases, toner components (e.g., silica, wax) or loading materials in paper are found to be adhered to the portion where the blurred images are produced. Accordingly, the coverage of contaminants (e.g., toner components, loading materials in paper) after the image formation should be taken into consideration, as well as the coverage of the metal soap, when calculating the exposure rate of the intermediate transfer belt.

SUMMARY

Exemplary aspects of the present invention are put forward in view of the above-described circumstances, and provide a novel image forming method which produces high-quality images without image defect, density unevenness, and color unevenness for an extended period of time even when the image forming speed is high.

In one exemplary embodiment, a novel image forming method includes applying a zinc-containing metal soap to a surface of an intermediate transfer belt including nitrogen on its surface, and the image forming method satisfies the following formula:

$$(1-C/D)\times 100(\%)-(B/A)\times 100(\%)\leq 10(\%)$$

wherein A (% by atom) and B (% by atom) represent a percentage content of nitrogen at the surface of the intermediate transfer belt before and after image formation on 1,000 sheets, respectively, measured by X-ray photoelectron spectroscopy (XPS), C (% by atom) represents a percentage content of zinc at the surface of the intermediate transfer belt after the image formation on 1,000 sheets, measured by XPS, and D (% by atom) represents a percentage content of zinc based on all elements other than hydrogen in the zinc-containing metal soap.

In another exemplary embodiment, a novel image forming method includes applying a zinc-containing metal soap to a surface of an intermediate transfer belt including nitrogen on its surface, and the image forming method satisfies the following formula:

$$(F/E)\times 100(\%)\leq 30(\%)$$

wherein E (% by atom) and F (% by atom) represent a percentage content of nitrogen at the surface of the intermediate transfer belt before and after application of the metal soap thereto for 5 minutes without image formation, respectively, measured by XPS.

In further exemplary embodiment, a novel image forming method includes applying a zinc-containing metal soap to a surface of an intermediate transfer belt including nitrogen on its surface, and the image forming method satisfies the following formulae described above:

$$(F/E)\times 100(\%)\leq 30(\%)$$

$$(1-C/D)\times 100(\%)-(B/A)\times 100(\%)\leq 10(\%)$$

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
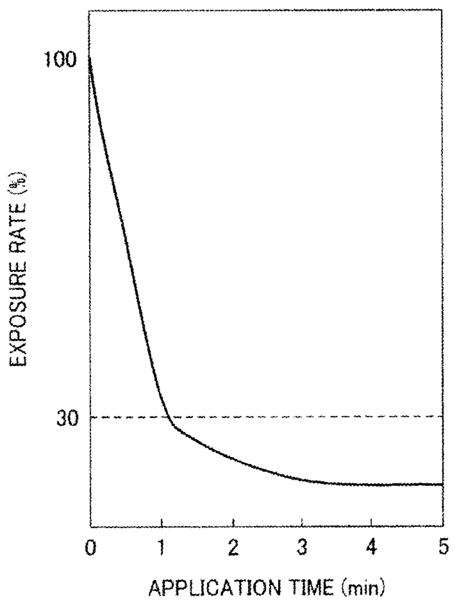
FIG. 1 is a graph showing a relation between the application time of a metal soap to an intermediate transfer belt and the exposure rate of the intermediate transfer belt.

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In the present specification, an improved method for calculating the exposure rate of the intermediate transfer belt is provided considering the coverage of contaminants after image formation. The details of this method are described below.

Because no contaminated material is comprised primarily of nitrogen, decrease in the percentage content of nitrogen at the surface of the intermediate transfer belt before and after image formation can only be attributable to contamination. Therefore, the exposure rate of the intermediate transfer belt is calculated by the following formula:

$$(B/A)\times 100(\%)$$

wherein A (% by atom) and B (% by atom) represent the percentage content of nitrogen at the surface of the intermediate transfer belt before and after image formation, respectively.

On the other hand, the area rate where the metal soap does not exist on the intermediate transfer belt is calculated by the following formula:

$$(1-C/D)\times 100(\%)$$

wherein C (% by atom) represents the percentage content of zinc at the surface of the intermediate transfer belt after the image formation and D (% by atom) represents the percentage content of zinc based on all elements other than hydrogen in the metal soap.

As the difference between (B/A)×100(%) and (1−C/D)×100(%) becomes smaller, the materials adhered to the intermediate transfer belt include more metal soap and less contamination.

When the difference between (B/A)×100(%) and (1−C/D)×100(%) is 10% or less, preferably 5% or less, and more preferably 3% or less, it means that the metal soap is effectively applied to the intermediate transfer belt and no contaminant is adhered thereto.

Although the calculation processes are different, both (B/A)×100(%) and (1−C/D)×100(%) represent the area rate where the metal soap does not exist on the intermediate transfer belt, i.e., the exposure rate of the intermediate transfer belt. As each of (B/A)×100(%) and (1−C/D)×100(%) becomes smaller, the materials adhered to the intermediate transfer belt include more metal soap and less contamination. When each of (B/A)×100(%) and (1−C/D)×100(%) is 30% or less, preferably 20% or less, and more preferably 10% or less, it means that the metal soap is effectively applied to the intermediate transfer belt.

The above-described method for calculating the exposure rate of the intermediate transfer belt is described in more detail below.

The percentage content of nitrogen and zinc on the surface of the intermediate transfer belt is measured by X-ray photoelectron spectroscopy (XPS). XPS detects elements existing from the outermost surface to a depth of from 5 to 8 nm of a sample, which is advantageous for detecting thinly-applied metal soaps on the intermediate transfer belt. When the detection depth is too great, thinly-applied metal soaps cannot be detected while only the elemental composition of the intermediate transfer belt is measured.

A (% by atom) represents the percentage content of nitrogen at the surface of the intermediate transfer belt before image formation, and B (% by atom) represents the percentage content of nitrogen at the surface of the intermediate transfer belt after the image formation on 1,000 sheets, both of which are measured by XPS.

Because no contaminated material is comprised primarily of nitrogen, decrease in the percentage content of nitrogen at the surface of the intermediate transfer belt before and after the image formation can only be attributed to contamination. Therefore, the exposure rate of the intermediate transfer belt is calculated by the following formula:

$$(B/A)\times 100(\%)$$

As (B/A)×100(%) becomes smaller, the materials adhered to the intermediate transfer belt include more metal soap and less contamination. When (B/A)×100(%) is 30% or less, preferably 20% or less, and more preferably 10% or less, it means that the metal soap is effectively applied to the intermediate transfer belt.

On the other hand, C (% by atom) represents the percentage content of zinc at the surface of the intermediate transfer belt after the image formation on 1,000 sheets, measured by XPS, and D (% by atom) represents the percentage content of zinc based on all elements other than hydrogen in the metal soap (e.g., a mixture of zinc stearate and zinc palmitate). The area rate where the metal soap does not exist on the intermediate transfer belt is calculated by the following formula:

$$(1-C/D)\times 100(\%)$$

As (1−C/D)×100(%) becomes smaller, the materials adhered to the intermediate transfer belt include more metal soap and less contamination. When (1−C/D)×100(%) is 30% or less, preferably 20% or less, and more preferably 10% or less, it means that the metal soap is effectively applied to the intermediate transfer belt.

When the exposure rate of the intermediate transfer belt (B/A)×100(%) is equal to the area rate where the metal soap does not exist on the intermediate transfer belt (1−C/D)×100(%), it means that there is no contamination and only the metal soap is existing on the intermediate transfer belt. As the difference between (B/A)×100(%) and (1−C/D)×100(%) becomes smaller, the materials adhered to the intermediate transfer belt include more metal soap and less contamination. When the difference between (B/A)×100(%) and (1−C/D)×100(%) is 10% or less, more preferably 5% or less, and most preferably 3% or less, it means that the metal soap is effectively applied to the intermediate transfer belt and no contaminant is adhered thereto.

By measuring the exposure rate of the intermediate transfer belt after application of the metal soap for 5 minutes without image formation (i.e., without contacting toner or paper), the condition of the intermediate transfer belt can be evaluated.

The metal soap can be applied to the intermediate transfer belt without image formation (i.e., without contacting toner or paper) by, for example, performing an image forming operation in an image forming apparatus or an intermediate transfer device to which neither toner nor paper is set.

FIG. 1 is a graph showing a relation between the application time of the metal soap to the intermediate transfer belt and the exposure rate of the intermediate transfer belt. FIG. 1 shows that the metal soap rapidly accumulates on the intermediate transfer belt immediately after the application starts, reaching saturation level within several minutes. It is reasonable to consider that that the accumulation of the metal soap is saturated after a 5-minute application.

The exposure rate of the intermediate transfer belt after application of the metal soap for 5 minutes without image formation is calculated from E (% by atom) which represents the percentage content of nitrogen at the surface of the intermediate transfer belt before application of the metal soap thereto, and F (% by atom) which represents the percentage content of nitrogen at the surface of the intermediate transfer belt after application of the metal soap for 5 minutes without image formation (i.e., without contacting toner or paper), both of which are measured by XPS.

Because the metal soap does not include nitrogen, decrease in the percentage content of nitrogen at the surface of the intermediate transfer belt after application of the metal soap is equal to decrease in the exposure rate of the intermediate transfer belt. Therefore, the exposure rate of the intermediate transfer belt is calculated by the following formula:

$$(F/E)\times 100(\%)$$

When (F/E)×100(%) is 30% or less, preferably 20% or less, and more preferably 10% or less, the difference between (B/A)×100(%) (i.e., the exposure rate of the intermediate transfer belt after the image formation on 1,000 sheets) and (1−C/D)×100 (%) (i.e., the area rate where the metal soap does not exist on the intermediate transfer belt after the image formation on 1,000 sheets) becomes 10% or less, more preferably 5% or less, and most preferably 3% or less, which means that the metal soap is effectively applied to the intermediate transfer belt.

Next, exemplary embodiments of the intermediate transfer belt according to this specification are described in detail.

The intermediate transfer belt is preferably in the form of a seamless belt. The seamless belt preferably comprises a polyimide resin from the viewpoint of creep deformation property and durability. All types of polyimide resins such as thermoplastic types, solvent-soluble types, and thermosetting types are usable. Among various types of polyimide resins, thermosetting type polyimide resins formed by subjecting a solution of a polyimide precursor in an organic polar solvent (i.e., a polyimide varnish) to thermal hardening are preferable. Such a solution is suitable for blending with various materials, especially resistance controlling agents for controlling electric resistance.

In order to apply a sufficient amount of a metal soap, the surface of the intermediate transfer belt is preferably roughened as appropriate by mechanical treatments (e.g., using an abrasive agent or an abrasive machine, blast processing, imposing on a roughened mold, varying drying conditions), chemical treatments (e.g., etching, electron beam treatment), or other treatments (e.g., adding a filler, forming a rough surface by spraying, adding and extracting a solvent).

One of the best ways to roughen the surface of the intermediate transfer belt includes forming linear convexities thereon, so that metal soap powders are scratched and pulverized by the convexities, and accumulated around the convexities. This results in effective covering of the intermediate transfer belt with the metal soap.

In a case where each of the convexity is too wide, the metal soap may be applied to limited portions on the intermediate transfer belt, resulting in uneven application of the metal soap thereto. In a case where each of the convexity it thin, i.e., linear, the intermediate transfer belt can be effectively and evenly covered with the metal soap.

The linear convexities can be formed on the surface of the intermediate transfer belt either at the time a polyimide resin is being formed by thermal hardening or after a polyimide resin has been already formed into the intermediate transfer belt.

An exemplary method of forming linear convexities on a surface of the intermediate transfer belt at the time a polyimide resin is being formed by thermal hardening includes forming linear concavities on a support and forming a film of a polyimide resin thereon. In this case, the concave profile of the support is transferred onto a surface of the resulting intermediate transfer belt (i.e., the polyimide resin), so that linear convexities are formed thereon. Suitable methods for forming a film of a polyimide resin include, but are not limited to, centrifugal molding, roll coating, blade coating, ring coating, dipping, spray coating, dispenser coating, and die coating. Among these methods, centrifugal molding is preferable.

For example, in a case where plural linear concavities are formed on an inner surface of a centrifugal mold (i.e., the support) while the average area surrounded by the linear concavities is controlled to from 1,000 to 30,000 $\mu m^2$, plural linear convexities are formed on a surface of the resulting intermediate transfer belt while the average area surrounded by the linear convexities is from 1,000 to 30,000 $\mu m^2$.

Such linear concavities can be formed on a mold by cutting processing, grinding processing, electrical processing, or sputtering, for example. Because microfabrication performed by cutting processing, grinding processing, or electrical processing is expensive, sputtering, which can perform uniform microfabrication at low cost, is preferable.

An exemplary method of forming linear convexities on a surface of the intermediate transfer belt which has been already formed includes pressing a mold having linear concavities against the surface of the intermediate transfer belt while heating the intermediate transfer belt. In this case, linear convexities are formed owing to thermoplastic property of the intermediate transfer belt. Other exemplary methods of forming linear convexities on a surface of the intermediate transfer belt which has been already formed include cutting processing, grinding processing, and electrical processing.

The linear convexities are defined as convexities having a linear profile. The linear profile may be, for example, a straight-line profile, a gently-curved-line profile, or a combination of a gently-curved-line profile and a short straight-line profile. Such a combination is most preferable because lubricant can be more uniformly adhered thereto.

The linear convexities may intersect one another while forming a pattern such as a reticular pattern, a honeycomb pattern, and a random pattern. Preferably, the linear convexities are provided forming a pattern having oblique components relative to the circumferential direction of the intermediate transfer belt, such as a honeycomb pattern and a random pattern, so as to prevent the occurrence of filming.

The convexities preferably have a height of from 0.01 to 1 $\mu m$ and a width of from 0.5 to 5 $\mu m$, and more preferably a height of from 0.02 to 0.1 $\mu m$ and a width of from 1 to 2 $\mu m$.

Each of the plural concavities surrounded by the linear convexities preferably has an average area of from 1,000 to 30,000 $\mu m^2$, and more preferably from 3,000 to 15,000 $\mu m^2$.

Each of the linear convexities preferably has the same height. However, each of the linear convexities may have a different height or a part of the linear convexities may be absent. Even when a part of the linear convexities is absent, the average area of the concavities can be calculated assuming that there is no absence of the linear convexity.

When the height is too small, in other words, the convexities are too short, it means that the surface of the intermediate transfer belt is so flat that the surface cannot be efficiently provided with a metal soap which typically includes zinc stearate having a molecular length of about 0.01 $\mu m$. By contrast, when the height is too large, in other words, the convexities are too high, the convexities act as extraneous substances existing on the surface of the intermediate transfer belt, thereby producing abnormal images. In order to effectively supply the surface of the intermediate transfer belt with a metal soap and not to produce abnormal images, the convexities preferably have a height of from 0.02 to 0.1 $\mu m$ as described above.

When the width is too small, it means that the convexities are too thin and brittle. Such convexities are likely to brake and thereby causing abnormal images. When the width is too large, it means that the apexes of the convexities are so wide that the surface of the intermediate transfer belt is substantially flat. Such a substantially flat surface cannot be effectively provided with a metal soap. The convexities having a width of from 1 to 2 μm are durable and contribute to efficient provision of a metal soap to the intermediate transfer belt.

When the average area of the concavities surrounded by the linear convexities is too small, the amount of a metal soap supplied to the intermediate transfer belt may be so large that the surface gloss of the intermediate belt may decrease. As a result, what is called a process control operation, which controls image forming conditions by measuring image density of an image formed on the intermediate transfer belt, is affected. Also, there is a possibility that the metal soap may act as an extraneous substance which causes abnormal images. When the average area of the concavities surrounded by the linear convexities is too large, the intermediate transfer belt is insufficiently provided with the metal soap when the linear speed is high. As a result, the metal soap is unevenly applied to the intermediate transfer belt, thereby producing abnormal images.

The profile of the convexities can be measured using a laser microscope, an optical interferometric microscope, an atomic force microscope (AFM), or a scanning electron microscope (SEM).

The area of the concavity surrounded by the linear convexities is measured from a photograph obtained using a scanning electron microscope (SEM). Within a square field with each side having a length of 400 μm, the area of each of the concavities surrounded by the convexities is measured and averaged.

The size of the square field depends on the density and profile of the convexities. The square field preferably has a side having a length of from 200 to 600 μm. When the side is too short, the calculation of the average area of the concavities may be adversely affected by local unevenness of the convexities, if any, resulting in an unreliable calculated value. When the side is too long, it may take too long a time to measure each area of the concavities.

Next, exemplary embodiments of polyimide for use in the intermediate transfer belt according to this specification are described.

An exemplary polyimide is obtained from a polyamic acid (i.e., a polyimide precursor) which is obtained from a reaction between an aromatic polycarboxylic anhydride or a derivative thereof and an aromatic diamine. Because polyimide is insoluble in solvents and non-meltable owing to its rigid structure of main-chain, the polyamic acid (i.e., a polyimide precursor), which is soluble in organic solvents, is previously subjected to various molding processes. The polyamic acid is then subjected to a dehydration reaction by heating or a chemical method so as to be cyclized (i.e., imidized). Thus, a polyimide is obtained. A typical reaction scheme (I) is described below.

(I)

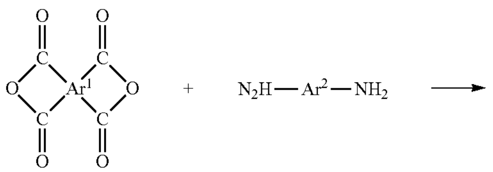

-continued

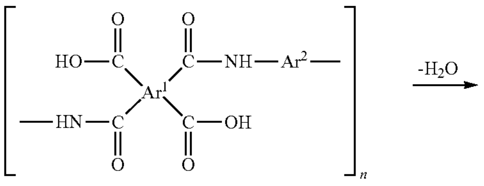

polyimide precursor

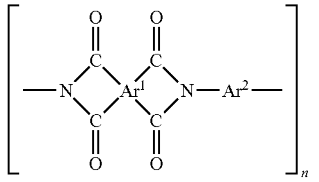

In the scheme (I), $Ar^1$ represents a tetravalent aromatic residue group including at least one six-membered carbon ring and $Ar^2$ represents a divalent aromatic residue group including at least one six-membered carbon ring.

Specific examples of usable aromatic polycarboxylic anhydrides include, but are not limited to, pyromellitic dianhydride, 3,3'-4,4'-benzophenone tetracarboxylic dianhydride, 2,2'-3,3'-benzophenone tetracarboxylic dianhydride, 3,3'-4,4'-biphenyl tetracarboxylic dianhydride, 2,2'-3,3'-biphenyl tetracarboxylic dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis (2,3-dicarboxyphenyl)methane dianhydride, bis(3,4-dicarboxyphenyl) methane dianhydride, 2,2-bis(3,4-dicarboxyphenyl)-1,1,1,3,3,3-hexafluoropropane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzenete tetracarboxylic dianhydride, 3,4,8,10-perylenete tetracarboxylic dianhydride, 2,3,6,7-anthracenete tetracarboxylic dianhydride, and 1,2,7,8-phenanthrene tetracarboxylic dianhydride. These compounds can be used alone or in combination. Additionally, other polycarboxylic anhydrides such as ethylene tetracarboxylic dianhydride and cyclopentane tetracarboxylic dianhydride can be used in combination in an amount less than 50% by mol.

Specific examples of usable aromatic diamines to be reacted with the aromatic polycarboxylic anhydrides include, but are not limited to, m-phenylenediamine, o-phenylenediamine, p-phenylenediamine, m-aminobenzylamine, p-aminobenzylamine, 4,4'-diaminodiphenyl ether, 3,3'-diaminodiphenyl ether, 3,4'-diaminodiphenyl ether, bis(3-aminophenyl) sulfide, (3-aminophenyl)(4-aminophenyl) sulfide, bis(4-aminophenyl) sulfide, bis(3-aminophenyl) sulfide, (3-aminophenyl)(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(3-aminophenoxy)phenyl]methane, bis[4-(4-aminophenoxy) phenyl]methane, 1,1-bis[4-(3-aminophenoxy) phenyl]ethane, 1,1-bis[4-(4-aminophenoxy) phenyl]ethane, 1,2-bis[4-(3-aminophenoxy)phenyl]ethane, 1,2-bis[4-(4-aminophenoxy) phenyl]ethane, 2,2-bis[4-(3-aminophenoxy) phenyl]propane, 2,2-bis[4-(4-aminophenoxy) phenyl]propane, 2,2-bis[4-(3-aminophenoxy)phenyl]butane, 2,2-bis[3-(3-aminophenoxy) phenyl]-1,1,1,3,3,3-hexafluoropropane, 2,2-bis[4-(4-aminophenoxy) phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy) benzene, 4,4'-bis(3-aminophenoxy)biphenyl, 4,4'-bis(4-aminophenoxy) biphenyl, bis[4-(3-aminophenoxy)phenyl]ketone, bis[4-(4-aminophenoxy) phenyl]ketone, bis[4-(3-aminophenoxy)phenyl]sulfide, bis [4-(4-aminophenoxy) phenyl]sulfide, bis[4-(3-aminophenoxy)phenyl]sulfoxide, bis[4-(4-aminophenoxy) phenyl]sulfoxide, bis[4-(3-aminophenoxy)phenyl]sulfone, bis[4-(4-aminophenoxy) phenyl]sulfone, bis[4-(3-aminophenoxy) phenyl]ether, bis[4-(4-aminophenoxy) phenyl]ether, 1,4-bis [4-(3-aminophenoxy)benzoyl]benzene, 1,3-bis[4-(3-aminophenoxy) benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl) phenoxy]benzophenone, 4,4'-bis[4-(4-amino-α,α-dimethylbenzyl) phenoxy]diphenyl sulfone, bis [4-{4-(4-aminophenoxy)phenoxy}phenyl]sulfone, 1,4-bis [4-(4-aminophenoxy)-α,α-dimethylbenzyl]benzene, and 1,3-bis[4-(4-aminophenoxy)-α,α-dimethylbenzyl]benzene. These compounds can be used alone or in combination.

A polyamic acid (i.e., a polyimide precursor) can be obtained from a polymerization reaction of a polycarboxylic anhydride with an approximately equimolar amount of a diamine in an organic polar solvent.

Specific examples of usable organic polar solvents for the polymerization reaction include, but are not limited to, sulfoxide solvents such as dimethyl sulfoxide and diethyl sulfoxide; formamide solvents such as N,N-dimethylformamide and N,N-diethylformamide; acetamide solvents such as N,N-dimethylacetamide and N,N-diethylacetamide; pyrrolidone solvents such as N-methyl-2-pyrrolidone and N-vinyl-2-pyrrolidone; phenol solvents such as phenol, o-cresol, m-cresol, p-cresol, xylenol, halogenated phenol, and catechol; ether solvents such as tetrahydrofuran, dioxane, and dioxolane; alcohol solvents such as methanol, ethanol, and butanol; cellosolves such as butyl cellosolve; hexamethyl phosphoramide; and γ-butyrolactone. These solvents can be used alone or in combination. Among these solvents, N,N-dimethylacetamide and N-methyl-2-pyrrolidone are preferable.

An exemplary method of preparing a polyamic acid (i.e., a polyimide precursor) is described below. First, at least one kind of diamine is dissolved or dispersed in the organic polar solvent to prepare a solution or a slurry, respectively, under atmosphere of an inert gas such as argon and nitrogen. Next, at least one kind of polycarboxylic anhydride or a derivative thereof, which may be either in a solid state or a solution/slurry state in the organic polar solvent, is added thereto to initiate a ring-opening polyaddition reaction. The ring-opening polyaddition reaction generates heat, thereby rapidly increasing the viscosity of the solution/slurry. Thus, a solution of a polyamic acid is prepared. The reaction temperature is preferably from −20 to 100° C., and more preferably 60° C. or less. The reaction time is preferably from about 30 minutes to 12 hours.

Alternatively, first, the polycarboxylic anhydride or a derivative thereof may be dissolved or dispersed in the organic polar solvent, and subsequently the diamine, which may be either in a solid state or a solution/slurry state in the organic polar solvent, may be added thereto. The mixing order of the polycarboxylic anhydride or a derivative thereof and the diamine is not limited. Of course, the polycarboxylic anhydride or a derivative thereof and the diamine can be added to the organic polar solvent simultaneously.

Consequently, a solution in which a polyamic acid (i.e., a polyimide precursor) is uniformly dissolved in the organic polar solvent is prepared from a polymerization reaction of the polycarboxylic anhydride or a derivative thereof with an equimolar amount of the diamine in the organic polar solvent.

In addition to the above-prepared solution of a polyamic acid (i.e., a polyimide precursor), commercially available polyimide varnishes in which a polyamic acid is dissolved in an organic solvent are also usable.

Specific examples of commercially available polyimide varnishes include, but are not limited to, TORAYNEECE (from Toray Industries, Inc.), U-Varnish (from Ube Industries, Ltd.), OPTMER (from JSR Corporation), SE812 (from Nissan Chemical Industries, Ltd.), and CRC8000 (from Sumitomo Bakelite Co., Ltd.).

Additionally, commercially available thermoplastic polyimide materials such as AURUM® (from Mitsui Chemicals, Inc.) and VESPEL® (from Du Pont) and solvent-soluble polyimide materials such as RIKACOAT (from New Japan Chemical Co., Ltd.), a block copolymerized polyimide Q-PILON® (from PI R & D Co., Ltd.), and GPI (from Gunei Chemical Industry Co., Ltd.) can be used in combination with the thermosetting polyimide materials as accessory components.

The polyamic acid solution, which may be either preparable from the reaction or commercially available, is then mixed with other components to prepare a coating liquid. The coating liquid is applied to a support (i.e., a mold) and heated so that the polyamic acid (i.e., a polyimide precursor) is transformed into a polyimide (i.e., imidized).

A polyamic acid can be transformed into a polyimide (i.e., imidized) by (1) heating or (2) a chemical method. An exemplary method of (1) includes heating the polyamic acid to 200 to 350° C., which is easy and practical. An exemplary method of (2) includes reacting the polyamic acid with a cyclodehydration reagent (e.g., a mixture of a carboxylic anhydride and a tertiary amine) and heating them. Because the method (2) is more complicated and costly, the method (1) is more practical.

Recently, another exemplary method of (2) has become practical in which an amine such as imidazole and quinoline is included in a varnish as a catalyst so that the imidization is accelerated at the time of drying. Generally, it is preferable that the imidization is completely terminated by heating the reaction system above the glass transition temperature of the resulting polyimide so that the polyimide may provide inherent abilities. The above-described method can accelerate the imidization at lower temperatures and can improve mechanical durability of the resulting polyimide. The amount of the catalyst is very small and the catalyst may be decomposed or sublimed at the time of drying.

The degree of imidization can be determined by a typical measuring method of imidization rate.

Specific exemplary methods of measuring imidization rate include, but are not limited to, a nuclear magnetic resonance spectroscopy (i.e., an NMR method) that calculates imidization rate from the integral ratio between $^{1}H$ peak observed around 9 to 11 ppm that corresponds to amide group and $^{1}H$ peak observed around 6 to 9 ppm that corresponds to aromatic ring; a Fourier transformation infrared spectroscopy (i.e., an FT-IR method); a method which determines quantity of moisture generated by ring-closing of imide; and a carboxylic acid neutralization titration method. Among these methods, a Fourier transformation infrared spectroscopy (i.e., an FT-IR method) is most practical.

For example, in the Fourier transformation infrared spectroscopy (i.e., an FT-IR method), the imidization rate is determined from the following equation:

$$\text{Imidization rate}(\%)=[(A)/(B)]\times 100$$

wherein (A) represents the number of moles of imide group at an imidization treatment stage (i.e., a calcination stage) and (B) represents the theoretical number of moles of imide group after complete imidization.

The number of moles of imide group is determined from absorbance ratio between characteristic absorptions of imide group which are measured by an FT-IR method. Representative absorbance ratios between characteristic absorptions for use in determination of the imidization rate are described below.

1) A ratio between an absorbance at 725 $cm^{-1}$ (corresponding to a scissoring vibration band of C═O group in imide ring) that is one of the characteristic absorptions of imide and an absorbance at 1,015 $cm^{-1}$ that is a characteristic absorption of benzene ring.

2) A ratio between an absorbance at 1,380 $cm^{-1}$ (corresponding to a scissoring vibration band of C—N group in imide ring) that is one of the characteristic absorptions of imide and an absorbance at 1,500 $cm^{-1}$ that is a characteristic absorption of benzene ring.

3) A ratio between an absorbance at 1,720 $cm^{-1}$ (corresponding to a scissoring vibration band of C═O group in imide ring) that is one of the characteristic absorptions of imide and an absorbance at 1,500 $cm^{-1}$ that is a characteristic absorption of benzene ring.

4) A ratio between an absorbance at 1,720 $cm^{-1}$ that is one of the characteristic absorptions of imide and an absorbance at 1,670 $cm^{-1}$ (corresponding to interaction between scissoring vibration of N—H group and stretching vibration of C—N group in amide group) that is a characteristic absorption of amide group.

Termination of imidization is reliably determined by disappearance of plural absorption bands at 3,000 to 3,300 $cm^{-1}$ corresponding to amide group.

The coating liquid may include another resin in combination with the polyimide, as well as various materials that give functions to the resulting intermediate transfer belt.

Specific examples of such materials include, but are not limited to, resistance controlling agents, reinforcement materials, leveling agents, surfactants, lubricants, antioxidants, and catalysts.

Among these materials, a resistance controlling agent is preferably added to the coating liquid so as to control the resistance of the resulting intermediate transfer belt.

Specific preferred materials for resistance controlling agents include, but are not limited to, fillers such as carbon black, graphite, metals (e.g., copper, tin, aluminum, indium), and metal oxides (e.g., tin oxide, zinc oxide, titanium oxide, indium oxide, antimony oxide, bismuth oxide, antimony-doped tin oxide, tin-doped indium oxide); conductive polymer materials such as polyether amide, polyether ester amide, polypyrrole, polythiophene, and polyaniline; and ion conductive materials such as tetraalkyl ammonium salt, trialkyl benzyl ammonium salt, alkyl sulfonate, alkylbenzene sulfonate, alkyl sulfate, glycerin fatty acid ester, sorbitan fatty acid ester, polyoxyethylene alkylamine, polyoxyethylene fatty alcohol ester, alkyl betaine, and lithium perchlorate. These materials can be used alone or in combination.

Among these materials, carbon black is preferable. Specific examples of usable carbon blacks include, but are not limited to, furnace black, acetylene black, ketjene black, and channel black. Surface-oxidized carbon blacks, the surface of which is oxidized, are also preferable.

Dispersing auxiliary agents may be used in combination with carbon blacks. Additionally, carbon blacks may be surface-treated by reacting a surface functional group with an organic compound reactive with the surface functional group.

An exemplary method of producing a seamless belt includes, for example, a dispersion preparing process in which a resistance controlling agent is dispersed in a solution of a polyimide precursor to prepare a dispersion; a coating liquid preparing process in which the content of the resistance controlling agent in the dispersion is adjusted to a predetermined value to prepare a coating liquid; a coating process in which the coating liquid is coated on a support (i.e., a mold); a solvent removal process in which the solvents are removed from the coating liquid which has been formed into a coated layer on the support by heating; an imidization process in which the polyimide precursor in the coated layer is subjected to imidization by heating; and releasing process in which the resulting thin film, i.e., a seamless belt is released from the support.

In the dispersion preparing process, the resistance controlling agent may be either directly dispersed in or mixed with the solution of a polyimide precursor, or the resistance controlling agent is dispersed in a solvent first and subsequently the resulting dispersion is dispersed in or mixed with the solution of a polyimide precursor.

For example, a carbon black, which is one of the resistance controlling agents, can be dispersed as follows.

First, N-methyl-2-pyrrolidone is mixed with a carbon black and a small amount of a polyimide precursor. The mixture is subjected to a dispersion treatment for a predetermined time using a ball mill, a paint shaker, or a bead mill filled with zirconia beads, to prepare a dispersion.

The dispersion is mixed with a solution of the polyimide precursor using a centrifugal mixer, a HENSCHEL MIXER, a homogenizer, or a sun-and-planet mixer, so as to control the concentration of the carbon black.

Additives such as a leveling agent and a catalyst can be added at that time of mixing, if needed.

The resulting mixture is preferably subjected to defoaming using a vacuum defoaming device.

The mold usable for centrifugal molding may be a metallic cylindrical support, the outer surface of which has concavities formed by sputtering. A release agent is applied to the mold and then the coating liquid containing a polyamic acid is applied thereon so that the resulting coated layer has a predetermined thickness. The coated layer is dried using a hot-air drier, an IH heater, or a far-infrared heater for 10 to 60 minutes at 80 to 120° C., and subsequently heated to 300 to 400° C. at a heating rate of from 2 to 5° C./min so as to initiate imidization.

The resulting intermediate transfer belt preferably has a thickness of from 50 to 100 μm. When the thickness is too small, strength and durability may be poor. When the thickness is too large, stiffness may be too large. It is generally difficult to reliably drive an intermediate transfer belt having a large stiffness with a driving roller having a small curvature.

The intermediate transfer belt preferably includes a carbon black as a resistance controlling agent in an amount of from 5 to 25% by weight. When the amount of carbon black is too small, it may be difficult to control resistance variation. When the amount of carbon black is too large, the resulting intermediate transfer belt may be more brittle and less flexible and durable.

The intermediate transfer belt preferably has a volume resistivity of from $10^6$ to $10^{10}$ Ωcm. When the resistance is too low, toner particles may be scattered on non-image area when transferred onto the intermediate transfer belt, thereby decreasing image definition. When the resistance is too high, transfer electric field may not contribute to improve transfer efficiency.

Next, exemplary embodiments of metal soaps (i.e., lubricants) according to this specification are described in detail.

Specific examples of usable metal soaps include, but are not limited to, metal soaps having stearic acid group such as zinc stearate, barium stearate, iron stearate, nickel stearate, cobalt stearate, copper stearate, strontium stearate, and calcium stearate; metal soaps having oleic acid group such as zinc oleate, barium oleate, lead oleate, iron oleate, nickel oleate, cobalt oleate, copper oleate, strontium oleate, and calcium oleate; metal soaps having palmitic acid group such as zinc palmitate, barium palmitate, lead palmitate, iron palmitate, nickel palmitate, cobalt palmitate, copper palmitate, strontium palmitate, and calcium palmitate. These compounds are organic solid lubricants which have affinity for toner.

The above metal soaps do not include nitrogen. However, the metal soaps are allowed to include a slight amount of nitrogen as impurity.

A mixture of zinc stearate and zinc palmitate is preferable as the lubricant. Even when the linear speed of the intermediate transfer belt is high, such a mixture can be spread over the intermediate transfer belt, resulting in complete coverage of the intermediate transfer belt with the metal soaps.

Both zinc stearate and zinc palmitate are metal salts of fatty acids. The fatty acid components, i.e., stearic acid and palmitic acid include 16 and 18 carbon atoms, respectively. Since zinc stearate and zinc palmitate have a similar structure, they are soluble with each other and function as substantially the same material. Both zinc stearate and zinc palmitate can protect the intermediate transfer belt.

When a specific amount of zinc palmitate is mixed with zinc stearate, the resulting mixture is easily spread over the intermediate transfer belt because zinc palmitate has a lower melting point than zinc stearate. Therefore, such a mixture can completely cover the intermediate transfer belt even when the linear speed of the intermediate transfer belt is high.

As the linear speed of an image bearing member (e.g., a photoreceptor) increases, the intermediate transfer belt receives more charging energy, especially AC charging energy. In this case, the intermediate transfer belt needs to improve protection effect by increasing the thickness of the metal soap applied thereon.

Zinc stearate is likely to adhere to the intermediate transfer belt while forming pairs of molecules, rather than single molecules randomly adhere thereto, in terms of stability of molecules. Accordingly, the saturated thickness of a molecular layer of zinc stearate is equal to the thickness of its bimolecular layer.

In a case in which a specific amount of zinc palmitate is mixed with the zinc stearate, the thickness of the resulting molecular layer varies by location because zinc palmitate has a shorter molecular length than zinc stearate. In this case, molecules are likely to accumulate on lower portions, thereby consequently forming a thicker layer having better protection effect than the bimolecular layer. If the mixed amount of zinc palmitate is too large, the bimolecular layer of zinc palmitate is likely to be formed, which is thinner and provides poorer protection effect than the bimolecular layer of zinc stearate.

Accordingly, an exemplary embodiment of the metal soap includes a mixture of zinc stearate and zinc palmitate. The weight ratio of the zinc stearate to the zinc palmitate is preferably from 73/27 to 45/55. Within the above range, the metal soap forms a thick layer which can entirely protect the intermediate transfer belt even when the linear speed of the intermediate transfer belt is high.

Another exemplary embodiment of the metal soap includes a mixture of zinc stearate, zinc palmitate, and another metal soap. Specific preferred examples of metal soaps to be mixed with zinc stearate and zinc palmitate include, but are not limited to, metal soaps having a similar structure to zinc stearate and zinc palmitate, such as zinc soaps of fatty acids having 13 to 20 carbon atoms.

The metal soap may be in the form of powder to be directly supplied onto the intermediate transfer belt. Alternatively, the metal soap may be in the form of block. In this case, a brush or the like is pressed against the block so that the brush scrapes off the block and the powdered metal soap is supplied onto the intermediate transfer belt. The latter is more preferable because a block-like metal soap is easy to store, a metal soap applicator (e.g., the brush) has a simple structure, and metal soaps are uniformly supplied.

An exemplary method of forming a metal soap block includes, for example, melting and mixing metal soaps (e.g., zinc stearate, zinc palmitate), pouring the melted metal soaps into a mold, and cooling the mold.

The resulting block of metal soaps may be adhered to a support made of a metal, a metal alloy, or a plastic with an adhesive.

It is preferable to measure the ratio between zinc stearate and zinc palmitate in every manufacturing lot of metal soap block because raw materials often include impurities. The ratio between zinc stearate and zinc palmitate in a metal soap block can be measured as follows, for example. First, a metal soap block is dissolved in a hydrochloric acid-methanol solution and heated to 80° C. so that stearic acid and palmitic acid are methylated. Next, the ratio between stearic acid and palmitic acid is measured by a gas chromatography and is converted into the ratio between zinc stearate and zinc palmitate.

Next, the image forming apparatus according to this specification is described in detail below.

Figure 2:
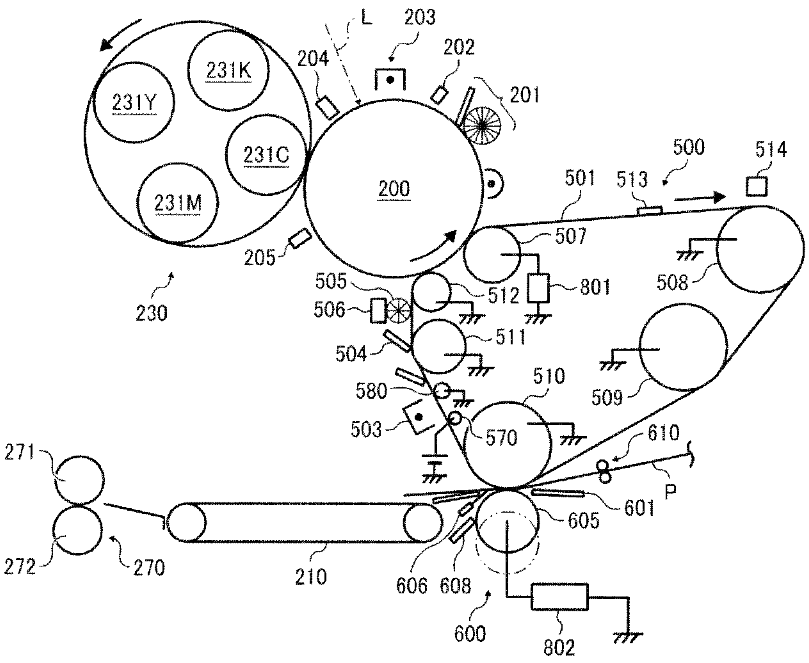
FIG. 2 is a schematic view illustrating an exemplary embodiment of an image forming apparatus according to this specification.

FIG. 2 is a schematic view illustrating an exemplary embodiment of the image forming apparatus according to this specification, equipped with the above-described intermediate transfer belt.

Before starting image forming operation, the metal soap can be applied to the intermediate transfer belt by performing an image forming operation without setting toner and paper in the image forming apparatus, until the accumulation of the metal soap is saturated.

An intermediate transfer unit 500 includes an intermediate transfer belt 501 stretched taut with plural rollers. A secondary transfer bias roller 605, a belt cleaning blade 504 that cleans the intermediate transfer belt 501, and a metal soap application brush 505 that applies a metal soap to the intermediate transfer belt 501 are provided facing the intermediate transfer belt 501. The secondary transfer bias roller 605 is included in a secondary transfer unit 600 and serves as a secondary transfer charger.

The intermediate transfer belt 501 is stretched taut with a primary transfer bias roller 507, a belt driving roller 508, a belt tension roller 509, a secondary transfer facing roller 510, a cleaning facing roller 511, and a feedback current detection roller 512. The primary transfer bias roller 507 serves as a primary transfer charger. Each of the rollers is made of a conductive material. Each of the rollers other than the primary transfer bias roller 507 is grounded. A transfer bias is applied to the primary transfer bias roller 507 from a primary transfer power source 801 which is constant-current-controlled or constant-voltage-controlled. The transfer bias is a current or a voltage controlled to a predetermined value based on the number of toner images which are superimposed on one another.

The intermediate transfer belt 501 is driven to rotate in a direction indicated by arrow A by the belt driving roller 508 that is driven to rotate in a direction indicated by arrow B by a driving motor, not shown. Preferred embodiments of the intermediate transfer belt 501 include a semiconductor and an insulator having a single-layer or multi-layer structure. The most preferred embodiment of the intermediate transfer belt 501 is the above-described intermediate transfer belt according to this specification, which provides improved durability and high quality images. The size of the intermediate transfer belt 501 is large enough to superimpose toner images formed on a photoreceptor 200 serving as an image bearing member.

The secondary transfer bias roller 605 can arbitrarily contact and separate from a portion of an outer surface of the intermediate transfer belt 501 which is stretched taut with the secondary transfer facing roller 510. A transfer paper P is sandwiched between the secondary transfer bias roller 605 and the intermediate transfer belt 501 at the portion in which the intermediate transfer belt 510 is stretched taut with the secondary transfer facing roller 510. A transfer bias being a predetermined current is applied to the secondary transfer bias roller 605 from a secondary transfer power source 802 which is constant-current-controlled.

A registration roller 610 conveys the transfer paper P to between the secondary transfer bias roller 605 and the portion of the outer surface of the intermediate transfer belt 501 which is stretched taut with the secondary transfer facing roller 510 in synchronization with an entry of a toner image thereto. A cleaning blade 608 is in contact with the secondary transfer bias roller 605 so as to remove substances adhered to a surface of the secondary transfer bias roller 605.

Once an image forming operation starts, the photoreceptor 200 is driven to rotate in a direction indicated by arrow C by a driving motor, not shown. The photoreceptor 200 is then charged by a charger 203 and is exposed to a light beam L emitted from an irradiator based on color image information, so that black, cyan, magenta, and yellow toner images are sequentially formed thereon. The intermediate transfer belt 501 is driven to rotate in a direction indicated by arrow A by the belt driving roller 508. The black, cyan, magenta, and yellow toner images are sequentially transferred from the photoreceptor 200 onto the intermediate transfer belt 501 by the transfer bias applied to the primary transfer bias roller 507 along with the rotation of the intermediate transfer belt 501. This process is hereinafter referred to as the primary transfer process. Finally, the black, cyan, magenta, and yellow toner images are superimposed on one another in this order on the intermediate transfer belt 501.

More specifically, for example, the black toner image is formed as follows. The charger 203 negatively and uniformly charges a surface of the photoreceptor 200 to a predetermined potential by corona discharge. An optical unit, not shown, directs a laser light beam L onto the charged surface of the photoreceptor 200 based on a black image signal. As a result, a black electrostatic latent image is formed on a portion of the photoreceptor 200 which has been exposed to the laser light beam, because charges disappear in an amount proportional to the amount of exposure light. A negatively-charged black toner on a developing roller in a black developing device 231K contacts the photoreceptor 200. The black toner does not adhere to a portion on which charges remain but adheres to the portion which has been exposed to the laser light beam, i.e., on which no charge remain. Thus, a black toner image is formed on the photoreceptor 200.

The black toner image is transferred from the photoreceptor 200 onto an outer surface of the intermediate transfer belt 501 that is driven to rotate at a constant speed while contacting the photoreceptor 200 (i.e., the primary transfer process). A slight amount of residual toner particles remaining on the photoreceptor 200 without being transferred onto the intermediate transfer belt 501 is removed by a photoreceptor cleaning device 201 so that the photoreceptor 200 can prepare for a next image formation. On the other hand, a scanner starts to read yellow image data. The photoreceptor 200 is exposed to a laser light beam based on the yellow image data so that a yellow electrostatic latent image is formed thereon.

A revolver developing unit 230 rotates after the trailing end of the black electrostatic latent image has passed a developing position and the leading end of the yellow electrostatic latent image reaches the developing position, so that a yellow developing device 231Y enter the developing position and develops the yellow electrostatic latent image with a yellow toner. Similarly, after the trailing end of the yellow electrostatic latent image has passed the developing position and the leading end of a cyan electrostatic latent image reaches the developing position, the revolver developing unit 230 rotates so that a cyan developing device 231C enter the developing position. Cyan and magenta toner images are formed in a similar manner as the black and yellow toner images.

Preferably, as illustrated in FIG. 2, a potential sensor 204 that detects the potential of the photoreceptor 200 after light irradiation and before development of an electrostatic latent image, and a toner image density sensor 205 that detects the density of a toner image on the photoreceptor 200 after the development of the electrostatic latent image and before the primary transfer, are provided around the photoreceptor 200.

The black, yellow, cyan, magenta toner images are sequentially formed on the photoreceptor 200 and sequentially transferred onto the same surface of the intermediate transfer belt 501 while adjusting the positions (i.e., the primary transfer process). Thus, a composite toner image (hereinafter simply "toner image") in which the black, yellow, cyan, magenta toner images are superimposed on one another is formed on the intermediate transfer belt 501. On the other hand, the transfer paper P is fed from a transfer paper cassette or a manual paper feed tray to a nip of the registration roller 610.

A secondary transfer area is formed between the secondary transfer bias roller 605 and the portion of the intermediate transfer belt 501 which is stretched taut with the secondary transfer facing roller 510. The transfer paper P is fed to the secondary transfer area along a guide plate 601 by rotation of the registration roller 610 in synchronization with an entry of the leading end of the toner image on the intermediate transfer belt 501 to the secondary transfer area, so that the leading end of the transfer paper P and the leading end of the toner image are coincident.

The transfer paper P is conveyed along the guide plate 601 and is neutralized when passing by a transfer paper neutralization charger 606 including a neutralization needle provided downstream from the secondary transfer area. The transfer paper P is further conveyed by a belt conveyer 210 to a fixing device 270. The toner image is melted and fixed on the transfer paper P at a nip formed between a heating roller 271 and a pressing roller 272 in the fixing device 270. The transfer paper P on which the toner image is fixed is discharged from the image forming apparatus by a discharge roller, not shown, and is stacked on a copy tray, not shown, face up. Of course, the fixing device 270 may include a heating belt in place of the heating roller 271.

After transferring the toner images, the surface of the photoreceptor 200 is cleaned by the photoreceptor cleaning device 201 and is uniformly neutralized by a neutralization lamp 202. Residual toner particles remaining on an outer surface of the intermediate transfer belt 501 without being transferred onto the transfer paper P are removed by the belt cleaning blade 504. The cleaning blade 504 contacts and separates from the outer surface of the intermediate transfer belt 501 at a predetermined timing by a cleaning member contact/separate mechanism, not shown.

A toner sealing member 503 is provided upstream from the belt cleaning blade 504 relative to the direction of movement of the intermediate transfer belt 501. The toner sealing member 503 is configured to receive fallen toner particles while the belt cleaning blade 504 removes residual toner particles from the intermediate transfer belt 501, thereby preventing the fallen toner particles from scattering around conveyance paths of the transfer paper P. The toner sealing member 503 contacts and separates from the outer surface of the intermediate transfer belt 501 at a predetermined timing by a cleaning member contact/separate mechanism, not shown, along with the belt cleaning blade 504.

The metal soap application brush 505 scrapes off a metal soap 506 and applies the powdered metal soap to an outer surface of the intermediate transfer belt 501 from which residual toner particles have been removed. The metal soap application brush 505 is provided in contact with the metal soap 506. Residual charges remaining on an outer surface of the intermediate transfer belt 501 are removed by applying a neutralization bias from a belt neutralization brush, not shown, that is in contact with the outer surface of the intermediate transfer belt 501. Each of the metal soap application brush 505 and the belt neutralization brush contacts and separates from the outer surface of the intermediate transfer belt 501 at a predetermined timing by a contact/separate mechanism, not shown.

When the copying operation is repeatedly performed, the image forming operation of the first color, i.e., black, starts again upon termination of the image forming operation of the fourth color, i.e., magenta. After transferring the composite toner image from the intermediate transfer belt 501 onto the first sheet of the transfer paper P, the intermediate transfer belt 501 is cleaned by the belt cleaning blade 504 and subsequently a black toner image to be formed on the second sheet of the transfer paper P is transferred from the photoreceptor 200 onto the intermediate transfer belt 501. The succeeding processes are the same as those in the copying operation of the first sheet.

The above-described copying operation is for producing a four-color composite toner image. When producing a three-color or two-color composite toner image, the repeated number of the copying operation is changed according to the number of the designated colors. When producing a one-color toner image, only the developing device corresponding to the designated color is brought into operation while bringing the belt cleaning blade 504 into contact with the intermediate transfer belt 501.

An optical sensor 514 may be provided between a primary transfer area where the photoreceptor 200 faces the primary transfer bias roller 507, and a secondary transfer area where the secondary transfer bias roller 605 faces the secondary transfer facing roller 510, while facing the intermediate transfer belt 501. The optical sensor 514 detects a predetermined sample image transferred onto the intermediate transfer belt 501, so as to determine the toner adherence and the moving position of the belt.

Further, a neutralization roller 570 and a grounding roller 580 may be provided contacting the back side of the intermediate transfer belt 510. The neutralization roller 570 is a conductive roller that removes residual charges remaining on the intermediate transfer belt 510. The grounding roller 580 is a metallic roller that charges the intermediate transfer belt 510 to 0 V after the neutralization roller 570 removes residual charges therefrom. Thus, the intermediate transfer belt 501 without residual potential can prepare for a next image forming operation without residual potential.

Figure 3:
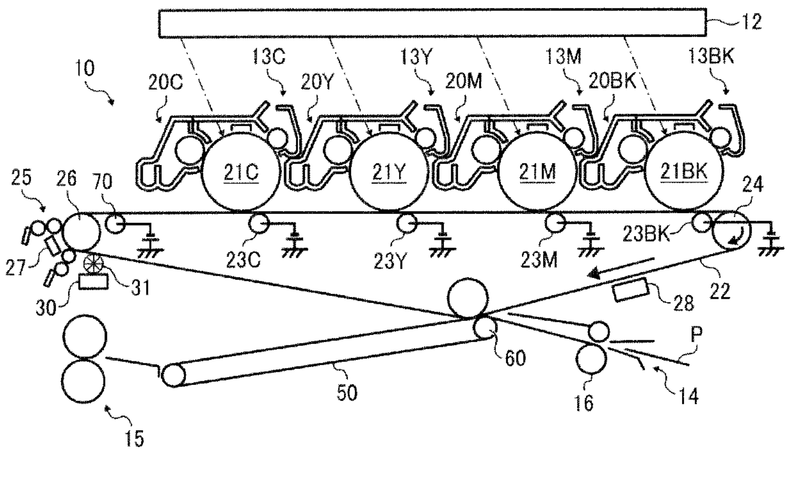
FIG. 3 is a schematic view illustrating another embodiment of the image forming apparatus according to this specification, in which plural photoreceptors are arranged in tandem along an intermediate transfer belt.

FIG. 3 is a schematic view illustrating another embodiment of the image forming apparatus according to this specification, in which plural photoreceptors are arranged in tandem along the intermediate transfer belt according to this specification.

An image forming apparatus illustrated in FIG. 3 is a digital color printer 10 including four photoreceptors 21BK, 21M, 21Y, and 21C for forming black, magenta, yellow, and cyan toner images, respectively, serving as image bearing members.

The printer 10 includes an image writing part 12, a black image forming part 13BK, a magenta image forming part 13M, a yellow image forming part 13Y, a cyan image forming part 13C, and a paper feeding part 14. Black, magenta, yellow, and cyan image information are converted into black, magenta, yellow, and cyan image signals in an image processing part, not shown, and the image signals are transmitted to the image writing part 12. The image writing part 12 may be, for example, a laser scanning optical system including a laser light source, a deflector such as a rotary polygon mirror, a scanning imaging optical system, and mirrors. The image writing part 12 includes four writing optical paths each corresponding to the black, magenta, yellow, and cyan image signals for writing images on the photoreceptors 21BK, 21M, 21Y, and 21C, respectively.

The black image forming part 13BK, the magenta image forming part 13M, the yellow image forming part 13Y, and the cyan image forming part 13C include the photoreceptors 21BK, 21M, 21Y, and 21C, respectively, serving as image bearing members. A preferred embodiment of the image bearing member is an organic photoreceptor. Around each of the photoreceptors 21BK, 21M, 21Y, and 21C, a respective charger, a respective irradiation part for directing a laser light beam onto the photoreceptors from the image writing part 12, a developing device 20BK, 20M, 20Y, and 20C, a primary transfer bias roller 23BK, 23M, 23Y, and 23C, a respective cleaning device, not shown, and a respective neutralization device, not shown, are provided. The developing devices 20BK, 20M, 20Y, and 20C employ a two-component magnetic brush developing method. An intermediate transfer belt 22 is provided between a series of the photoreceptors 21BK, 21M, 21Y, and 21C and a series of the primary transfer bias rollers 23BK, 23M, 23Y, and 23C so that toner images formed on each photoreceptors are sequentially transferred and superimposed on the intermediate transfer belt 22 to form a composite toner image. The intermediate transfer belt 22 is stretched taut with a belt driving roller 24 and a belt driven roller 26.

On the other hand, a transfer paper P is fed from the paper feeding part 14 onto a transfer conveyance belt 50 through a registration roller 16. A secondary transfer bias roller 60 transfers the composite toner image from the intermediate transfer belt 22 onto the transfer paper P at the contact point of the intermediate transfer belt 22 with the transfer conveyance belt 50. The transfer paper P having the composite toner image thereon is then conveyed to a fixing device 15, and the composite toner image is fixed on the transfer paper P in the fixing device 15. The transfer paper P on which the composite toner image is fixed is discharged from the printer 10.

Residual toner particles remaining on the intermediate transfer belt 22 without being transferred onto the transfer paper P are removed by a belt cleaning device 25. Preferably, a neutralizer 27 for neutralizing residual charges on the intermediate transfer belt after the secondary transfer is provided upstream from the belt cleaning device 25 relative to the direction of rotation of the intermediate transfer belt 22. A metal soap applicator is provided downstream from the belt cleaning device 25 relative to the direction of rotation of the intermediate transfer belt 22. The metal soap applicator includes a solid metal soap 30 and a conductive brush 31 for scraping the metal soap and applying the metal soap to the intermediate transfer belt 22. The conductive brush 31 is in contact with the intermediate transfer belt 22 so that the metal soap is constantly applied thereto.

An optical sensor 28 may be provided between a series of primary transfer areas where the photoreceptors 21BK, 21M, 21Y, and 21C face the respective primary transfer bias rollers 23BK, 23M, 23Y, and 23C, and a secondary transfer area where the secondary transfer bias roller 60 faces the intermediate transfer belt 22, while facing the intermediate transfer belt 22. The optical sensor 28 detects a predetermined sample image transferred onto the intermediate transfer belt 22, so as to determine the toner adherence and the moving position of the belt.

Further, a bias roller 70 may be provided contacting the back side of the intermediate transfer belt 22. The bias roller 70 is a conductive roller that applies a bias to the intermediate transfer belt 22 to reduce load on the primary transfer bias rollers 23BK, 23M, 23Y, and 23C.

The above-described embodiments of the intermediate transfer belt according to this specification are preferably usable for the intermediate transfer belts 501 and 22. Additionally, the embodiments of the intermediate transfer belt according to this specification are also preferably usable for the belt conveyer 210 illustrated in FIG. 2 or the transfer conveyance belt 50 illustrated in FIG. 3.

The intermediate transfer belt according to this specification is usable at any linear speeds. Preferably, the intermediate transfer belt according to this specification is used at a linear speed of 200 mm/sec or more. When the linear speed is 450 mm/sec or more, conventional intermediate transfer belts cause uneven application of metal soap, while the intermediate transfer belt according to this specification does not.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

XPS Analysis Conditions

Instrument: AXIS-ULTRA (from Kratos Surface Analysis/Shimadzu Corporation)

X-ray source: Mono Al

Analysis area: 700×300 μm

Example 1

(Preparation of Intermediate Transfer Belt A)

To prepare a carbon black dispersion, 2 parts of a polyimide solution U-Varnish A (including 18% of solid components, from Ube Industries, Ltd.), 8 parts of a carbon black Special Black 4A (from Degussa), and 90 parts of N-methyl-2-pyrrolidone (from Mitsubishi Chemical Corporation) are mixed, and the mixture is subjected to a dispersion treatment for 5 hours using a bead mill disperser filled with zirconia beads with a diameter of 1 mm.

To prepare a coating liquid, 50 parts of the above-prepared carbon black dispersion, 50 parts of a polyimide solution U-Varnish A (including 18% of solid components, from Ube Industries, Ltd.), and 0.01 parts of a polyether-modified silicone FZ2105 (from Dow Corning Toray Co., Ltd.) are mixed, and the mixture is subjected to defoaming using a centrifugal agitation defoaming device.

The coating liquid is poured into a metallic cylindrical mold having an outer diameter of 100 mm and a length of 300 mm, the inner surface of which has been treated with a lubricant, while rotating the metallic cylindrical mold at a revolution of 50 rpm, so that the inner surface thereof is uniformly applied with the coating liquid. The inner surface of the metallic cylindrical mold have linear concavities with a depth of 0.01 μm and a width of 1 μm, which are formed by sputtering, so that the average area defined by the linear concavities becomes 3,000 $\mu m^2$. The applied amount of the coating liquid is controlled so that the resulting layer has a thickness of 70 μm. At the completion of application of the coating liquid to the inner surface, the metallic cylindrical mold is put in a hot-air circular drier while rotating, and is heated to 100° C. at a heating rate of 3° C./min. The metallic cylindrical mold is kept heated at 100° C. for 30 minutes. The metallic cylindrical mold is then put in a heating furnace (a baking furnace) capable of performing high-temperature treatments while stopping rotation, and is heated to 310° C. at a heating rate of 2° C./min. The metallic cylindrical mold is kept heated at 310° C. for 60 minutes to be calcined, followed by cooling to room temperature.

Thus, an intermediate transfer belt A is prepared. The surface of the intermediate transfer belt A has linear convexities with a height of 0.01 μm and a width of 1 μm. The average area defined by the linear convexities is 3,000 $\mu m^2$.

(Preparation of Metal Soap A)

First, 45 parts of zinc stearate and 55 parts of zinc palmitate (having a primary particle diameter of 0.18 μm) are weighed and mixed. The mixture is heated to 145° C., and the melted mixture is poured into a mold, followed by cooling. Thus, a metal soap block with each side having a length of 40 mm, 8 mm, and 350 mm is prepared. The metal soap block is adhered to a support with an adhesive to prepare a metal soap A. Further, the percentage content D (% by atom) of zinc based on all elements other than hydrogen in the metal soap is calculated from the mixing ratio between zinc stearate and zinc palmitate.

(Evaluation)

The intermediate transfer belt A is measured by XPS so as to determine the percentage content A (% by atom) of nitrogen at the surface of the intermediate transfer belt A before image formation. Thereafter, the intermediate transfer belt A and the metal soap A are set in the image forming apparatus illustrated in FIG. 2, and the image forming apparatus produces a test chart having a image density of 7% on 1,000 sheets of a paper TYPE 6200 (from Ricoh Co., Ltd.) at 23° C., 45% RH, while setting the linear speed of image formation to 250 mm/sec.

Thereafter, the intermediate transfer belt A is measured by XPS again so as to determine the percentage content B (% by atom) of nitrogen and the percentage content C (% by atom) of zinc at the surface of the intermediate transfer belt A after the image formation. Thus, the exposure rate of the intermediate transfer belt (B/A)×100(%) and the area rate where the metal soap does not exist on the intermediate transfer belt (1−C/D)×100(%) are calculated. Further, the produced image quality is evaluated.

In a case where the produced image quality is good, the image forming apparatus further produces a test chart having a image density of 7% on 5 sheets of a paper TYPE 6200 (from Ricoh Co., Ltd.) at 23° C., 45% RH, while setting the linear speed of image formation to 450 mm/sec. This image forming operation is repeated until total number of the printed sheets becomes 30,000, and the produced image quality is evaluated.

Example 2

(Preparation of Intermediate Transfer Belt B)

The procedure for preparation of the intermediate transfer belt A in Example 1 is repeated except for changing the profile of the convexities on the surface. Specifically, the mold is changed to another mold, the inner surface of which has linear concavities with a depth of 0.02 μm and a width of 1 μm, which are formed so that the average area defined by the linear concavities is 3,000 $\mu m^2$.

Thus, an intermediate transfer belt B is prepared. The surface of the intermediate transfer belt B has linear convexities with a height of 0.02 μm and a width of 1 μm. The average area defined by the linear convexities is 3,000 $\mu m^2$.

(Evaluation)

The intermediate transfer belt B is evaluated as the same manner in Example 1.

Example 3

(Preparation of Intermediate Transfer Belt C)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 1 μm, which are formed so that an area defined by the linear concavities is 3,000 $\mu m^2$.

Thus, an intermediate transfer belt C is prepared. The surface of the intermediate transfer belt C has linear convexities with a height of 0.1 μm and a width of 1 μm. The average area defined by the linear convexities is 3,000 $\mu m^2$.

(Evaluation)

The intermediate transfer belt C is evaluated as the same manner in Example 1.

Example 4

(Preparation of Intermediate Transfer Belt D)

The procedure for preparation of the intermediate transfer belt A in Example 1 is repeated except for changing the profile of the convexities on the surface. Specifically, the mold is changed to another mold, the inner surface of which has linear concavities with a depth of 1 μm and a width of 1 μm, which are formed so that an area defined by the linear concavities is 3,000 $\mu m^2$.

Thus, an intermediate transfer belt D is prepared. The surface of the intermediate transfer belt D has linear convexities with a height of 1 μm and a width of 1 μm. The average area defined by the linear convexities is 3,000 $\mu m^2$.

(Evaluation)

The intermediate transfer belt D is evaluated as the same manner in Example 1.

Example 5

(Preparation of Intermediate Transfer Belt E)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 0.5 μm, which are formed so that an area defined by the linear concavities is 3,000 $\mu m^2$.

Thus, an intermediate transfer belt E is prepared. The surface of the intermediate transfer belt E has linear convexities with a height of 0.1 μm and a width of 0.5 μm. The average area defined by the linear convexities is 3,000 $\mu m^2$.

(Evaluation)

The intermediate transfer belt E is evaluated as the same manner in Example 1.

Example 6

(Preparation of Intermediate Transfer Belt F)

To prepare a coating liquid, 45 parts of the carbon black dispersion prepared in Example 1, 55 parts of a polyimide solution U-Varnish A (including 18% of solid components, from Ube Industries, Ltd.), and 0.01 parts of a polyether-modified silicone FZ2105 (from Dow Corning Toray Co., Ltd.) are mixed, and the mixture is subjected to defoaming using a centrifugal agitation defoaming device.

The procedure for preparation of the intermediate transfer belt A in Example 1 is repeated except for replacing the coating liquid with the above-prepared coating liquid and changing the profile of the convexities on the surface. Specifically, the mold is changed to another mold, the inner surface of which has linear concavities with a depth of 0.1 μm and a width of 2 μm in a honeycomb pattern, which are formed so that an area defined by the linear concavities is 3,000 $\mu m^2$.

Thus, an intermediate transfer belt F is prepared. The surface of the intermediate transfer belt F has linear convexities with a height of 0.1 μm and a width of 2 μm in a honeycomb pattern. The average area defined by the linear convexities is 3,000 $\mu m^2$.

(Evaluation)

The intermediate transfer belt F is evaluated as the same manner in Example 1.

Example 7

(Preparation of Intermediate Transfer Belt G)

The procedure for preparation of the intermediate transfer belt F in Example 6 is repeated except for changing the profile of the convexities on the surface. Specifically, the mold is changed to another mold, the inner surface of which has linear concavities with a depth of 0.1 μm and a width of 5 μm, which are formed so that an area defined by the linear concavities is 3,000 $\mu m^2$.

Thus, an intermediate transfer belt G is prepared. The surface of the intermediate transfer belt G has linear convexities with a height of 0.1 μm and a width of 5 μm. The average area defined by the linear convexities is 3,000 $\mu m^2$.

(Evaluation)

The intermediate transfer belt G is evaluated as the same manner in Example 1.

Example 8

(Preparation of Intermediate Transfer Belt H)

The procedure for preparation of the intermediate transfer belt F in Example 6 is repeated except for changing the profile of the convexities on the surface. Specifically, the mold is changed to another mold, the inner surface of which has linear concavities with a depth of 0.1 μm and a width of 1 μm, which are formed so that an area defined by the linear concavities is 1,000 $\mu m^2$.

Thus, an intermediate transfer belt H is prepared. The surface of the intermediate transfer belt H has linear convexities with a height of 0.1 μm and a width of 1 μm. The average area defined by the linear convexities is 1,000 $\mu m^2$.

(Evaluation)

The intermediate transfer belt H is evaluated as the same manner in Example 1.

Example 9

(Preparation of Intermediate Transfer Belt I)

The procedure for preparation of the intermediate transfer belt F in Example 6 is repeated except for changing the profile of the convexities on the surface. Specifically, the mold is changed to another mold, the inner surface of which has linear concavities with a depth of 0.1 μm and a width of 1 μm, which are formed so that an area defined by the linear concavities is 15,000 $\mu m^2$.

Thus, an intermediate transfer belt I is prepared. The surface of the intermediate transfer belt I has linear convexities with a height of 0.1 μm and a width of 1 μm. The average area defined by the linear convexities is 15,000 $\mu m^2$.

(Evaluation)

The intermediate transfer belt H is evaluated as the same manner in Example 1.

Example 10

(Preparation of Intermediate Transfer Belt J)

The procedure for preparation of the intermediate transfer belt F in Example 6 is repeated except for changing the profile of the convexities on the surface. Specifically, the mold is changed to another mold, the inner surface of which has linear concavities with a depth of 0.1 μm and a width of 1 μm, which are formed so that an area defined by the linear concavities is 30,000 $\mu m^2$.

Thus, an intermediate transfer belt J is prepared. The surface of the intermediate transfer belt J has linear convexities with a height of 0.1 μm and a width of 1 μm. The average area defined by the linear convexities is 30,000 $\mu m^2$.

(Evaluation)

The intermediate transfer belt J is evaluated as the same manner in Example 1.

Example 11

(Preparation of Metal Soap B)

The procedure for preparation of the metal soap A in Example 1 is repeated except for changing the amount of zinc stearate and zinc palmitate to 72.5 parts and 27.5 parts, respectively. Thus, a metal soap B is prepared.

(Evaluation)

The intermediate transfer belt C prepared in Example 3 is evaluated as the same manner in Example 1 except for replacing the metal soap A with the metal soap B.

Example 12

(Preparation of Metal Soap C)

The procedure for preparation of the metal soap A in Example 1 is repeated except for changing the amount of zinc stearate and zinc palmitate to 70 parts and 30 parts, respectively. Thus, a metal soap C is prepared.

(Evaluation)

The intermediate transfer belt C prepared in Example 3 is evaluated as the same manner in Example 1 except for replacing the metal soap A with the metal soap C.

Example 13

(Preparation of Metal Soap D)

The procedure for preparation of the metal soap A in Example 1 is repeated except for changing the amount of zinc stearate and zinc palmitate to 40 parts and 60 parts, respectively. Thus, a metal soap D is prepared.

(Evaluation)

The intermediate transfer belt C prepared in Example 3 is evaluated as the same manner in Example 1 except for replacing the metal soap A with the metal soap D.

Example 14

(Preparation of Intermediate Transfer Belt K)

To prepare a carbon black dispersion, 4 parts of a polyimide solution U-Varnish A (including 18% of solid components, from Ube Industries, Ltd.), 8 parts of a carbon black Special Black 4A (from Degussa), and 88 parts of N-methyl-2-pyrrolidone (from Mitsubishi Chemical Corporation) are mixed, and the mixture is subjected to a dispersion treatment for 5 hours using a bead mill disperser filled with zirconia beads with a diameter of 1 mm.

To prepare a coating liquid, 45 parts of the above-prepared carbon black dispersion, 55 parts of a polyimide solution U-Varnish A (including 18% of solid components, from Ube Industries, Ltd.), and 0.01 parts of a polyether-modified silicone FZ2105 (from Dow Corning Toray Co., Ltd.) are mixed, and the mixture is subjected to defoaming using a centrifugal agitation defoaming device.

The coating liquid is poured into a metallic cylindrical mold having an outer diameter of 100 mm and a length of 300 mm, the inner surface of which has been treated with a lubricant, while rotating the metallic cylindrical mold at a revolution of 50 rpm, so that the inner surface thereof is uniformly applied with the coating liquid. The inner surface of the metallic cylindrical mold have linear concavities with a depth of 0.01 μm and a width of 1 μm, which are formed by sputtering, so that the average area defined by the linear concavities becomes 3,000 $\mu m^2$. The applied amount of the coating liquid is controlled so that the resulting layer has a thickness of 70 μm. At the completion of application of the coating liquid to the inner surface, the metallic cylindrical mold is put in a hot-air circular drier while rotating, and is heated to 100° C. at a heating rate of 3° C./min. The metallic cylindrical mold is kept heated at 100° C. for 30 minutes. The metallic cylindrical mold is then put in a heating furnace (a baking furnace) capable of performing high-temperature treatments while stopping rotation, and is heated to 310° C. at a heating rate of 2° C./min. The metallic cylindrical mold is kept heated at 310° C. for 60 minutes to be calcined, followed by cooling to room temperature.

Thus, an intermediate transfer belt K is prepared. The surface of the intermediate transfer belt K has linear convexities with a height of 0.01 μm and a width of 1 μm. The average area defined by the linear convexities is 3,000 $\mu m^2$.

(Evaluation)

The intermediate transfer belt K is measured by XPS so as to determine the percentage content E (% by atom) of nitrogen at the surface of the intermediate transfer belt K. Thereafter, the intermediate transfer belt K and the metal soap A are set in the image forming apparatus illustrated in FIG. 2, and the image forming apparatus is driven for 5 minutes without setting toner and paper therein, so that the metal soap A is applied to the intermediate transfer belt K for 5 minutes. The application brush presses the metal soap A with a pressing force of 20 gf/cm while rotating, so that the metal soap A is finely pulverized and supplied to the intermediate transfer belt K. The metal soap A is further spread over the intermediate transfer belt K by the blade.

Thereafter, the intermediate transfer belt K is measured by XPS again so as to determine the percentage content F (% by atom) of nitrogen at the surface of the intermediate transfer belt K after applying the metal soap for 5 minutes. Thus, the exposure rate of the intermediate transfer belt (F/E)×100(%) is calculated.

The intermediate transfer belt K is reset in the image forming apparatus illustrated in FIG. 2, and toner and paper are also set therein. The image forming apparatus produces a test chart having a image density of 7% on 1,000 sheets of a paper TYPE 6200 (from Ricoh Co., Ltd.) at 23° C., 45% RH, while setting the linear speed of image formation to 250 mm/sec, and the produced image quality is evaluated.

In a case where the produced image quality is good, the image forming apparatus further produces a test chart having a image density of 7% on 5 sheets of a paper TYPE 6200 (from Ricoh Co., Ltd.) at 23° C., 45% RH, while setting the linear speed of image formation to 450 mm/sec. This image forming operation is repeated until total number of the printed sheets becomes 30,000, and the produced image quality is evaluated.

Example 15

(Preparation of Intermediate Transfer Belt L)

The procedure for preparation of the intermediate transfer belt K in Example 14 is repeated except for changing the profile of the convexities on the surface. Specifically, the mold is changed to another mold, the inner surface of which has linear concavities with a depth of 0.02 μm and a width of 1 μm, which are formed so that the average area defined by the linear concavities is 3,000 $\mu m^2$.

Thus, an intermediate transfer belt L is prepared. The surface of the intermediate transfer belt L has linear convexities with a height of 0.02 μm and a width of 1 μm. The average area defined by the linear convexities is 3,000 $\mu m^2$.

(Evaluation)

The intermediate transfer belt L is evaluated as the same manner in Example 14.

Example 16

(Preparation of Intermediate Transfer Belt M)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 3,000 $\mu m^2$.

Thus, an intermediate transfer belt M is prepared. The surface of the intermediate transfer belt M has linear convexities with a height of 0.1 μm and a width of 1 μm. The average area defined by the linear convexities is 3,000 $\mu m^2$.

(Evaluation)

The intermediate transfer belt M is evaluated as the same manner in Example 14.

Example 17

(Preparation of Intermediate Transfer Belt N)

The procedure for preparation of the intermediate transfer belt K in Example 14 is repeated except for changing the profile of the convexities on the surface. Specifically, the mold is changed to another mold, the inner surface of which has linear concavities with a depth of 1 μm and a width of 1 μm, which are formed so that the average area defined by the linear concavities is 3,000 $\mu m^2$.

Thus, an intermediate transfer belt N is prepared. The surface of the intermediate transfer belt N has linear convexities with a height of 1 μm and a width of 1 μm. The average area defined by the linear convexities is 3,000 $\mu m^2$.

(Evaluation)

The intermediate transfer belt N is evaluated as the same manner in Example 14.

Example 18

(Preparation of Intermediate Transfer Belt O)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 0.5 μm, which are formed so that the average area defined by the linear concavities is 3,000 $\mu m^2$.

Thus, an intermediate transfer belt O is prepared. The surface of the intermediate transfer belt O has linear convexities with a height of 0.1 μm and a width of 0.5 μm. The average area defined by the linear convexities is 3,000 $\mu m^2$.

(Evaluation)

The intermediate transfer belt O is evaluated as the same manner in Example 14.

Example 19

(Preparation of Intermediate Transfer Belt P)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 2 μm, which are formed so that the average area defined by the linear concavities is 3,000 $\mu m^2$.

Thus, an intermediate transfer belt P is prepared. The surface of the intermediate transfer belt P has linear convexities with a height of 0.1 μm and a width of 2 μm. The average area defined by the linear convexities is 3,000 $\mu m^2$.

(Evaluation)

The intermediate transfer belt P is evaluated as the same manner in Example 14.

Example 20

(Preparation of Intermediate Transfer Belt Q)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 5 μm, which are formed so that the average area defined by the linear concavities is 3,000 $\mu m^2$.

Thus, an intermediate transfer belt Q is prepared. The surface of the intermediate transfer belt Q has linear convexities with a height of 0.1 μm and a width of 5 μm. The average area defined by the linear convexities is 3,000 $\mu m^2$.

(Evaluation)

The intermediate transfer belt Q is evaluated as the same manner in Example 14.

Example 21

(Preparation of Intermediate Transfer Belt R)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 1,000 $\mu m^2$.

Thus, an intermediate transfer belt R is prepared. The surface of the intermediate transfer belt R has linear convexities with a height of 0.1 μm and a width of 1 μm. The average area defined by the linear convexities is 1,000 $\mu m^2$.

(Evaluation)

The intermediate transfer belt R is evaluated as the same manner in Example 14.

Example 22

(Preparation of Intermediate Transfer Belt S)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 15,000 $\mu m^2$.

Thus, an intermediate transfer belt R is prepared. The surface of the intermediate transfer belt R has linear convexities with a height of 0.1 μm and a width of 1 μm. The average area defined by the linear convexities is 15,000 $\mu m^2$.

(Evaluation)

The intermediate transfer belt S is evaluated as the same manner in Example 14.

Example 23

(Preparation of Intermediate Transfer Belt T)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 30,000 $\mu m^2$.

Thus, an intermediate transfer belt T is prepared. The surface of the intermediate transfer belt T has linear convexities with a height of 0.1 μm and a width of 1 μm. The average area defined by the linear convexities is 30,000 $\mu m^2$.

(Evaluation)

The intermediate transfer belt T is evaluated as the same manner in Example 14.

Example 24

The intermediate transfer belt M prepared in Example 16 is evaluated as the same manner in Example 14 except for replacing the metal soap A with the metal soap B prepared in Example 11.

Example 25

The intermediate transfer belt M prepared in Example 16 is evaluated as the same manner in Example 14 except for replacing the metal soap A with the metal soap C prepared in Example 12.

Example 26

The intermediate transfer belt M prepared in Example 16 is evaluated as the same manner in Example 14 except for replacing the metal soap A with the metal soap D prepared in Example 13.

Example 27

The procedure in Example 16 is repeated except for replacing the image forming apparatus illustrated in FIG. 2 with that illustrated in FIG. 3.

Example 28

The procedure in Example 24 is repeated except for replacing the image forming apparatus illustrated in FIG. 2 with that illustrated in FIG. 3.

Example 29

(Preparation of Intermediate Transfer Belt U)

To prepare a carbon black dispersion, 4 parts of a polyimide solution U-Varnish A (including 18% of solid components, from Ube Industries, Ltd.), 8 parts of a carbon black Special Black 4A (from Degussa), and 88 parts of N-methyl-2-pyrrolidone (from Mitsubishi Chemical Corporation) are mixed, and the mixture is subjected to a dispersion treatment for 5 hours using a bead mill disperser filled with zirconia beads with a diameter of 1 mm.

To prepare a coating liquid, 50 parts of the above-prepared carbon black dispersion, 50 parts of a polyimide solution U-Varnish A (including 18% of solid components, from Ube Industries, Ltd.), and 0.01 parts of a polyether-modified silicone FZ2105 (from Dow Corning Toray Co., Ltd.) are mixed, and the mixture is subjected to defoaming using a centrifugal agitation defoaming device.

The coating liquid is poured into a metallic cylindrical mold having an outer diameter of 100 mm and a length of 300 mm, the inner surface of which has been treated with a lubricant, while rotating the metallic cylindrical mold at a revolution of 50 rpm, so that the inner surface thereof is uniformly applied with the coating liquid. The inner surface of the metallic cylindrical mold have linear concavities with a depth of 0.1 μm and a width of 1 μm, which are formed by sputtering, so that the average area defined by the linear concavities becomes 3,000 $\mu m^2$. The applied amount of the coating liquid is controlled so that the resulting layer has a thickness of 70 μm. At the completion of application of the coating liquid to the inner surface, the metallic cylindrical mold is put in a hot-air circular drier while rotating, and is heated to 100° C. at a heating rate of 3° C./min. The metallic cylindrical mold is kept heated at 100° C. for 30 minutes. The metallic cylindrical mold is then put in a heating furnace (a baking furnace) capable of performing high-temperature treatments while stopping rotation, and is heated to 310° C. at a heating rate of 2° C./min. The metallic cylindrical mold is kept heated at 310° C. for 60 minutes to be calcined, followed by cooling to room temperature.

Thus, an intermediate transfer belt U is prepared. The surface of the intermediate transfer belt U has linear convexities with a height of 0.1 μm and a width of 1 μm. The average area defined by the linear convexities is 3,000 $\mu m^2$.

The above procedure is repeated so that 2 sheets of the intermediate transfer belt U are prepared.

(Evaluation)

First, one sheet of the intermediate transfer belt U is measured by XPS so as to determine the percentage content E (% by atom) of nitrogen at the surface of the intermediate transfer belt U. Thereafter, the intermediate transfer belt U and the metal soap A are set in the image forming apparatus illustrated in FIG. 2, and the image forming apparatus is driven for 5 minutes without setting toner and paper therein, so that the metal soap A is applied to the intermediate transfer belt U for 5 minutes. The application brush presses the metal soap A with a pressing force of 20 gf/cm while rotating, so that the metal soap A is finely pulverized and supplied to the intermediate transfer belt U. The metal soap A is further spread over the intermediate transfer belt U by the blade.

Thereafter, the intermediate transfer belt U is measured by XPS again so as to determine the percentage content F (% by atom) of nitrogen at the surface of the intermediate transfer belt U after applying the metal soap for 5 minutes. Thus, the exposure rate of the intermediate transfer belt (F/E)×100(%) is calculated.

Next, another sheet of the intermediate transfer belt U is measured by XPS so as to determine the percentage content A (% by atom) of nitrogen at the surface of the intermediate transfer belt A before image formation. Thereafter, the intermediate transfer belt U and the metal soap A are set in the image forming apparatus illustrated in FIG. 2, and the image forming apparatus produces a test chart having a image density of 7% on 1,000 sheets of a paper TYPE 6200 (from Ricoh Co., Ltd.) at 23° C., 45% RH, while setting the linear speed of image formation to 250 mm/sec.

Thereafter, the intermediate transfer belt U is measured by XPS again so as to determine the percentage content B (% by atom) of nitrogen and the percentage content C (% by atom) of zinc at the surface of the intermediate transfer belt A after the image formation. Thus, the exposure rate of the intermediate transfer belt (B/A)×100(%) and the area rate where the metal soap does not exist on the intermediate transfer belt (1−C/D)×100(%) are calculated. Further, the produced image quality is evaluated.

In a case where the produced image quality is good, the image forming apparatus further produces a test chart having a image density of 7% on 5 sheets of a paper TYPE 6200 (from Ricoh Co., Ltd.) at 23° C., 45% RH, while setting the linear speed of image formation to 450 mm/sec. This image forming operation is repeated until total number of the printed sheets becomes 30,000, and the produced image quality is evaluated.

Example 30

The procedure in Example 29 is repeated except for replacing the metal soap A with the metal soap B prepared in Example 11, and replacing the image forming apparatus illustrated in FIG. 2 with that illustrated in FIG. 3.

Example 31

The procedure in Example 29 is repeated except for changing the evaluation procedure as follows.

(Evaluation)

First, one sheet of the intermediate transfer belt U is measured by XPS so as to determine the percentage content E (% by atom) of nitrogen at the surface of the intermediate transfer belt U. Thereafter, the intermediate transfer belt U and the metal soap A are set in an image forming apparatus IMAGIO NP C6000 (from Ricoh Co., Ltd.), which has been modified, and the image forming apparatus is driven for 5 minutes without setting toner and paper therein, so that the metal soap A is applied to the intermediate transfer belt U for 5 minutes. The application brush presses the metal soap A with a pressing force of 20 gf/cm while rotating, so that the metal soap A is finely pulverized and supplied to the intermediate transfer belt U. The metal soap A is further spread over the intermediate transfer belt U by the blade.

Thereafter, the intermediate transfer belt U is measured by XPS again so as to determine the percentage content F (% by atom) of nitrogen at the surface of the intermediate transfer belt U after applying the metal soap for 5 minutes. Thus, the exposure rate of the intermediate transfer belt (F/E)×100(%) is calculated.

Next, another sheet of the intermediate transfer belt U is measured by XPS so as to determine the percentage content A (% by atom) of nitrogen at the surface of the intermediate transfer belt A before image formation. Thereafter, the intermediate transfer belt U and the metal soap A are set in the image forming apparatus IMAGIO NP C6000 (from Ricoh Co., Ltd.), which has been modified, and the image forming apparatus produces a test chart having a image density of 7% on 1,000 sheets of a paper TYPE 6200 (from Ricoh Co., Ltd.) at 23° C., 45% RH, while setting the linear speed of image formation to 250 mm/sec.

Thereafter, the intermediate transfer belt U is measured by XPS again so as to determine the percentage content B (% by atom) of nitrogen and the percentage content C (% by atom) of zinc at the surface of the intermediate transfer belt A after the image formation. Thus, the exposure rate of the intermediate transfer belt (B/A)×100(%) and the area rate where the metal soap does not exist on the intermediate transfer belt (1−C/D)×100(%) are calculated. Further, the produced image quality is evaluated.

In a case where the produced image quality is good, the image forming apparatus further produces a test chart having a image density of 7% on 5 sheets of a paper TYPE 6200 (from Ricoh Co., Ltd.) at 23° C., 45% RH, while setting the linear speed of image formation to 450 mm/sec. This image forming operation is repeated until total number of the printed sheets becomes 3,000,000, and the produced image quality is evaluated.

Comparative Example 1

(Preparation of Intermediate Transfer Belt V)

The procedure for preparation of the intermediate transfer belt A in Example 1 is repeated except for changing the profile of the convexities on the surface. Specifically, the mold is changed to another mold, the inner surface of which has linear concavities with a depth of 0.005 μm and a width of 1 μm, which are formed so that the average area defined by the linear concavities is 3,000 $\mu m^2$.

Thus, an intermediate transfer belt V is prepared. The surface of the intermediate transfer belt V has linear convexities with a height of 0.005 μm and a width of 1 μm. The average area defined by the linear convexities is 3,000 $μm^2$.

(Evaluation)

The intermediate transfer belt V is evaluated as the same manner in Example 1.

Comparative Example 2

(Preparation of Intermediate Transfer Belt W)

The procedure for preparation of the intermediate transfer belt A in Example 1 is repeated except for changing the profile of the convexities on the surface. Specifically, the mold is changed to another mold, the inner surface of which has linear concavities with a depth of 1.5 μm and a width of 1 μm, which are formed so that the average area defined by the linear concavities is 3,000 $μm^2$.

Thus, an intermediate transfer belt W is prepared. The surface of the intermediate transfer belt W has linear convexities with a height of 1.5 μm and a width of 1 μm. The average area defined by the linear convexities is 3,000 $μm^2$.

(Evaluation)

The intermediate transfer belt W is evaluated as the same manner in Example 1.

Comparative Example 3

(Preparation of Intermediate Transfer Belt X)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 0.4 μm, which are formed so that the average area defined by the linear concavities is 3,000 $μm^2$.

Thus, an intermediate transfer belt X is prepared. The surface of the intermediate transfer belt X has linear convexities with a height of 0.1 μm and a width of 0.4 μm. The average area defined by the linear convexities is 3,000 $μm^2$.

(Evaluation)

The intermediate transfer belt X is evaluated as the same manner in Example 1.

Comparative Example 4

(Preparation of Intermediate Transfer Belt Y)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 6 μm, which are formed so that the average area defined by the linear concavities is 3,000 $μm^2$.

Thus, an intermediate transfer belt Y is prepared. The surface of the intermediate transfer belt Y has linear convexities with a height of 0.1 μm and a width of 6 μm. The average area defined by the linear convexities is 3,000 $μm^2$.

(Evaluation)

The intermediate transfer belt Y is evaluated as the same manner in Example 1.

Comparative Example 5

(Preparation of Intermediate Transfer Belt Z)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 900 $μm^2$.

Thus, an intermediate transfer belt Z is prepared. The surface of the intermediate transfer belt Z has linear convexities with a height of 0.1 μm and a width of 1 μm. The average area defined by the linear convexities is 900 $μm^2$.

(Evaluation)

The intermediate transfer belt Z is evaluated as the same manner in Example 1.

Comparative Example 6

(Preparation of Intermediate Transfer Belt AA)

The procedure for preparation of the intermediate transfer belt A in Example 1 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 35,000 $μm^2$.

Thus, an intermediate transfer belt AA is prepared. The surface of the intermediate transfer belt AA has linear convexities with a height of 0.1 μm and a width of 1 μm. The average area defined by the linear convexities is 35,000 $μm^2$.

(Evaluation)

The intermediate transfer belt AA is evaluated as the same manner in Example 1.

Comparative Example 7

(Preparation of Metal Soap E)

First, zinc stearate (having a primary particle diameter of 0.18 μm) is heated to 145° C., and the melted zinc stearate is poured into a mold, followed by cooling. Thus, a metal soap block with each side having a length of 40 mm, 8 mm, and 350 mm is prepared. The metal soap block is adhered to a support with an adhesive to prepare a metal soap E. Further, the percentage content D (% by atom) of zinc based on all elements other than hydrogen in the metal soap is calculated.

(Evaluation)

The intermediate transfer belt C prepared in Example 3 is evaluated as the same manner in Example 1 except for replacing the metal soap A with the metal soap E.

Comparative Example 8

(Preparation of Intermediate Transfer Belt AB)

The procedure for preparation of the intermediate transfer belt K in Example 14 is repeated except for changing the profile of the convexities on the surface. Specifically, the mold is changed to another mold, the inner surface of which has linear concavities with a depth of 0.005 μm and a width of 1 μm, which are formed so that the average area defined by the linear concavities is 3,000 $μm^2$.

Thus, an intermediate transfer belt AB is prepared. The surface of the intermediate transfer belt AB has linear convexities with a height of 0.005 μm and a width of 1 μm. The average area defined by the linear convexities is 3,000 $μm^2$.

(Evaluation)

The intermediate transfer belt AB is evaluated as the same manner in Example 14.

Comparative Example 9

(Preparation of Intermediate Transfer Belt AC)

The procedure for preparation of the intermediate transfer belt K in Example 14 is repeated except for changing the profile of the convexities on the surface. Specifically, the mold is changed to another mold, the inner surface of which has linear concavities with a depth of 1.5 μm and a width of 1 μm, which are formed so that the average area defined by the linear concavities is 3,000 $μm^2$.

Thus, an intermediate transfer belt AC is prepared. The surface of the intermediate transfer belt AC has linear convexities with a height of 1.5 μm and a width of 1 μm. The average area defined by the linear convexities is 3,000 $μm^2$.

(Evaluation)

The intermediate transfer belt AC is evaluated as the same manner in Example 14.

Comparative Example 10

(Preparation of Intermediate Transfer Belt AD)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 0.4 μm, which are formed so that the average area defined by the linear concavities is 3,000 $μm^2$.

Thus, an intermediate transfer belt AD is prepared. The surface of the intermediate transfer belt AD has linear convexities with a height of 0.1 μm and a width of 0.4 μm. The average area defined by the linear convexities is 3,000 $μm^2$.

(Evaluation)

The intermediate transfer belt AD is evaluated as the same manner in Example 14.

Comparative Example 11

(Preparation of Intermediate Transfer Belt AE)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 6 μm, which are formed so that the average area defined by the linear concavities is 3,000 $μm^2$.

Thus, an intermediate transfer belt AE is prepared. The surface of the intermediate transfer belt AE has linear convexities with a height of 0.1 μm and a width of 6 μm. The average area defined by the linear convexities is 3,000 $μm^2$.

(Evaluation)

The intermediate transfer belt AE is evaluated as the same manner in Example 14.

Comparative Example 12

(Preparation of Intermediate Transfer Belt AF)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 900 $μm^2$.

Thus, an intermediate transfer belt AF is prepared. The surface of the intermediate transfer belt AF has linear convexities with a height of 0.1 μm and a width of 1 μm. The average area defined by the linear convexities is 900 $μm^2$.

(Evaluation)

The intermediate transfer belt AF is evaluated as the same manner in Example 14.

Comparative Example 13

(Preparation of Intermediate Transfer Belt AG)

The procedure for preparation of the intermediate transfer belt K in Example 14 is repeated except for changing the profile of the convexities on the surface. Specifically, the mold is changed to another mold, the inner surface of which has linear concavities with a depth of 0.1 μm and a width of 1 μm, which are formed so that the average area defined by the linear concavities is 35,000 $μm^2$.

Thus, an intermediate transfer belt AG is prepared. The surface of the intermediate transfer belt AG has linear convexities with a height of 0.1 μm and a width of 1 μm. The average area defined by the linear convexities is 35,000 $μm^2$.

(Evaluation)

The intermediate transfer belt AG is evaluated as the same manner in Example 14.

Comparative Example 14

The intermediate transfer belt M prepared in Example 16 is evaluated as the same manner in Example 14 except for replacing the metal soap A with the metal soap E.

Comparative Example 15

The procedure in Comparative Example 8 is repeated except for replacing the image forming apparatus illustrated in FIG. 2 with that illustrated in FIG. 3.

Comparative Example 16

The procedure in Comparative Example 14 is repeated except for replacing the image forming apparatus illustrated in FIG. 2 with that illustrated in FIG. 3.

Comparative Example 17

(Preparation of Intermediate Transfer Belt AH)

The procedure for preparation of the intermediate transfer belt U in Example 29 is repeated except for changing the profile of the convexities on the surface. Specifically, the mold is changed to another mold, the inner surface of which has linear concavities with a depth of 0.005 μm and a width of 1 μm, which are formed so that the average area defined by the linear concavities is 3,000 $μm^2$.

Thus, an intermediate transfer belt AH is prepared. The surface of the intermediate transfer belt AH has linear convexities with a height of 0.005 μm and a width of 1 μm. The average area defined by the linear convexities is 3,000 $μm^2$.

(Evaluation)

The intermediate transfer belt AH is evaluated as the same manner in Example 29.

Comparative Example 18

The procedure in Example 29 is repeated except for replacing the metal soap A with the metal soap E prepared in Comparative Example 7, and replacing the image forming apparatus illustrated in FIG. 2 with that illustrated in FIG. 3.

The evaluation results are shown in Tables 1 to 3. "Image Quality" is graded into the following three levels.

A: Very good.

B: Very good when the linear speed is 250 mm/sec, but dots are slightly deleted when the linear speed is 450/sec.

C: Poor.

TABLE 1-1

| | A | B | C | D |
|---|---|---|---|---|
| | | (atm %) | | |
| Ex. 1 | 5.20 | 0.86 | 2.07 | 2.58 |
| Ex. 2 | 5.20 | 0.34 | 2.38 | 2.58 |
| Ex. 3 | 5.20 | 0.09 | 2.51 | 2.58 |
| Ex. 4 | 5.20 | 0.81 | 2.00 | 2.58 |
| Ex. 5 | 5.20 | 0.56 | 2.11 | 2.58 |
| Ex. 6 | 5.70 | 0.31 | 2.38 | 2.58 |
| Ex. 7 | 5.70 | 0.85 | 2.07 | 2.58 |
| Ex. 8 | 5.70 | 1.17 | 1.95 | 2.58 |
| Ex. 9 | 5.70 | 1.04 | 1.89 | 2.58 |
| Ex. 10 | 5.70 | 0.95 | 1.95 | 2.58 |
| Ex. 11 | 5.20 | 0.41 | 2.26 | 2.51 |
| Ex. 12 | 5.20 | 1.34 | 1.77 | 2.52 |
| Ex. 13 | 5.20 | 1.19 | 1.86 | 2.60 |
| Comp. Ex. 1 | 5.20 | 1.86 | 1.32 | 2.58 |
| Comp. Ex. 2 | 5.20 | 1.12 | 1.59 | 2.58 |
| Comp. Ex. 3 | 5.20 | 1.98 | 1.07 | 2.58 |
| Comp. Ex. 4 | 5.20 | 1.34 | 1.58 | 2.58 |
| Comp. Ex. 5 | 5.20 | 1.75 | 1.31 | 2.58 |
| Comp. Ex. 6 | 5.20 | 1.53 | 1.34 | 2.58 |
| Comp. Ex. 7 | 5.70 | 1.84 | 1.11 | 2.44 |

TABLE 1-2

| | (B/A) × 100 (%) | (1 − C/D) × 100 (%) | {(1 − C/D) − (B/A)} × 100 (%) | Image Quality |
|---|---|---|---|---|
| Ex. 1 | 16.6 | 19.9 | 3.3 | B |
| Ex. 2 | 6.5 | 7.7 | 1.2 | A |
| Ex. 3 | 1.8 | 2.6 | 0.8 | A |
| Ex. 4 | 15.5 | 22.3 | 6.8 | B |
| Ex. 5 | 10.7 | 18.2 | 7.5 | B |
| Ex. 6 | 5.4 | 7.9 | 2.5 | A |
| Ex. 7 | 14.9 | 19.6 | 4.7 | B |
| Ex. 8 | 20.6 | 24.4 | 3.8 | B |
| Ex. 9 | 18.3 | 26.8 | 8.5 | B |
| Ex. 10 | 16.7 | 24.3 | 7.6 | B |
| Ex. 11 | 7.8 | 10.0 | 2.2 | A |
| Ex. 12 | 25.8 | 29.7 | 3.9 | B |
| Ex. 13 | 22.9 | 28.3 | 5.4 | B |
| Comp. Ex. 1 | 35.7 | 48.9 | 13.2 | C |
| Comp. Ex. 2 | 21.6 | 38.4 | 16.8 | C |
| Comp. Ex. 3 | 38.1 | 58.4 | 20.3 | C |
| Comp. Ex. 4 | 25.8 | 38.7 | 12.9 | C |
| Comp. Ex. 5 | 33.6 | 49.3 | 15.7 | C |
| Comp. Ex. 6 | 29.5 | 47.9 | 18.4 | C |
| Comp. Ex. 7 | 32.2 | 54.7 | 22.5 | C |

TABLE 2

| | (F/E) × 100 (%) | Image Quality |
|---|---|---|
| Ex. 14 | 13.5 | B |
| Ex. 15 | 4.7 | A |
| Ex. 16 | 1.3 | A |
| Ex. 17 | 12.6 | B |
| Ex. 18 | 10.1 | B |
| Ex. 19 | 3.2 | A |
| Ex. 20 | 11.9 | B |
| Ex. 21 | 16.4 | B |
| Ex. 22 | 14.0 | B |
| Ex. 23 | 13.8 | B |
| Ex. 24 | 5.1 | A |
| Ex. 25 | 22.3 | B |
| Ex. 26 | 18.7 | B |
| Ex. 27 | 1.2 | A |
| Ex. 28 | 4.9 | A |
| Comp. Ex. 8 | 36.0 | C |
| Comp. Ex. 9 | 32.2 | C |
| Comp. Ex. 10 | 34.5 | C |
| Comp. Ex. 11 | 31.4 | C |
| Comp. Ex. 12 | 35.6 | C |
| Comp. Ex. 13 | 33.8 | C |
| Comp. Ex. 14 | 34.9 | C |
| Comp. Ex. 15 | 35.3 | C |
| Comp. Ex. 16 | 33.7 | C |

TABLE 3-1

| | A | B | C | D | E | F |
|---|---|---|---|---|---|---|
| | | | (atm %) | | | |
| Ex. 29 | 5.40 | 0.09 | 2.51 | 2.58 | 5.40 | 0.06 |
| Ex. 30 | 5.40 | 0.44 | 2.26 | 2.51 | 5.40 | 0.25 |
| Ex. 31 | 5.40 | 0.06 | 2.52 | 2.58 | | |
| Comp. Ex. 17 | 5.40 | 1.92 | 1.27 | 2.58 | 5.40 | 1.80 |
| Comp. Ex. 18 | 5.40 | 1.81 | 1.02 | 2.44 | 5.40 | 1.71 |

TABLE 3-2

| | (B/A) × 100 (%) | (1 − C/D) × 100 (%) | {(1 − C/D) − (B/A)} × 100 (%) | (F/E) × 100 (%) | Image Quality |
|---|---|---|---|---|---|
| Ex. 29 | 1.6 | 2.6 | 1.0 | 1.1 | A |
| Ex. 30 | 8.2 | 9.8 | 1.6 | 4.7 | A |
| Ex. 31 | 1.2 | 2.3 | 1.1 | 0.9 | A |
| Comp. Ex. 17 | 35.6 | 50.9 | 15.3 | 33.4 | C |
| Comp. Ex. 18 | 33.6 | 58.1 | 24.5 | 31.7 | C |

Tables 1-1 and 1-2 show that when the exposure rate of the intermediate transfer belt after image formation on 1,000 sheets, i.e., (B/A)×100(%), is 30% or less, preferably 20% or less, and more preferably 10% or less; the area rate where the metal soap does not exist on the intermediate transfer belt, i.e., (1−C/D)×100(%), is 30% or less, preferably 20% or less, and more preferably 10% or less; and the difference therebetween, i.e., {(1−C/D)−(B/A)}×100(%), is 10% or less, preferably 5% or less, and more preferably 3% or less, high quality images are produced, which means that the metal soap is uniformly applied to the intermediate transfer belt.

Table 2 shows that when the exposure rate of the intermediate transfer belt after applying the metal soap for 5 minutes without contacting toner and paper, i.e., (F/E)×100(%), is 30% or less, preferably 20% or less, and more preferably 10% or less, high quality images are produced, which means that the metal soap is uniformly applied to the intermediate transfer belt.

Tables 3-1 and 3-2 show that when (F/E)×100(%) is 30% or less, preferably 20% or less, and more preferably 10% or less; (B/A)×100(%) is 30% or less, preferably 20% or less, and more preferably 10% or less; (1−C/D)×100(%) is 30% or less, preferably 20% or less, and more preferably 10% or less; and {(1−C/D)−(B/A)}×100(%) is 10% or less, preferably 5% or less, high quality images are produced, which means that the metal soap is uniformly applied to the intermediate transfer belt.

The exemplary intermediate transfer belts include linear convexities on their surface. The linear convexities have a height of from 0.01 to 1 μm and a width of from 0.5 to 5 μm, preferably a height of from 0.02 to 0.1 μm and a width of from 1 to 2 μm. The average area defined by the linear convexities is from 1,000 to 30,000 $\mu m^2$, preferably from 3,000 to 15,000 $\mu m^2$. The metal soap applied to the intermediate transfer belt is preferably a metal soap in which zinc stearate and zinc palmitate are mixed at a mixing ratio of from 73:27 to 45:55.

Additional modifications and variations of the present invention are possible in light of the above teachings. It is therefore to be understood that within the scope of the appended claims the invention may be practiced other than as specifically described herein.

What is claimed is:

1. An image forming method, comprising:

applying a zinc-containing metal soap to a surface of an intermediate transfer belt that already has nitrogen on said surface thereof to satisfy the following formulae:

$$(1-C/D)\times 100(\%)-(B/A)\times 100(\%)\leq 10(\%)$$

$$(B/A)\times 100(\%)\leq 30(\%)$$

$$(1-C/D)\times 100(\%)\leq 30(\%)$$

wherein

A (% by atom) and B (% by atom) represent a percentage content of nitrogen at the surface of the intermediate transfer belt before and after image formation on 1,000 sheets, respectively, measured by X-ray photoelectron spectroscopy (XPS), C (% by atom) represents a percentage content of zinc at the surface of the intermediate transfer belt after the image formation on 1,000 sheets, measured by XPS, and D (% by atom) represents a percentage content of zinc based on all elements other than hydrogen in the zinc-containing metal soap before the image formation on 1,000 sheets; and utilizing the intermediate transfer belt, to which the zinc-containing metal soap has been applied, in an image forming operation in an image forming apparatus or an intermediate transfer device, wherein the zinc-containing metal soap is applied to the intermediate transfer belt upstream from a primary transfer position where a toner image is to be transferred from a photoreceptor onto the intermediate transfer belt and downstream from a secondary transfer position where the toner image is to be transferred from the intermediate transfer belt onto an image recording medium, the zinc-containing metal soap is a mixture of zinc stearate and zinc palmitate, and a mixing ratio of the zinc stearate to the zinc palmitate is from 73/27 to 45/55.

2. The image forming method according to claim 1, wherein the metal soap applied to the surface of an intermediate transfer belt does not include nitrogen.

3. The image forming method according to claim 1, wherein the intermediate transfer belt has linear convexities on its surface, the linear convexities having a height of from 0.01 to 1 μm and a width of from 0.5 to 5 μm.

4. The image forming method according to claim 3, wherein the linear convexities divide the surface of the intermediate transfer belt into multiple regions, and each of the regions defined by the linear convexities has an area of from 1,000 to 30,000 $\mu m^2$.

5. An image forming method, comprising:

applying a zinc-containing metal soap to a surface of an intermediate transfer belt that already has nitrogen on said surface thereof to satisfy the following formula:

$$(F/E)\times 100(\%)\leq 30(\%)$$

wherein E (% by atom) and F (% by atom) represent a percentage content of nitrogen at the surface of the intermediate transfer belt before and after application of the metal soap thereto for 5 minutes without image formation, respectively, measured by X-ray photoelectron spectroscopy (XPS); and utilizing the intermediate transfer belt, to which the zinc-containing metal soap has been applied, in an image forming operation in an image forming apparatus or an intermediate transfer device, wherein the zinc-containing metal soap is applied to the intermediate transfer belt upstream from a primary transfer position where a toner image is to be transferred from a photoreceptor onto the intermediate transfer belt and downstream from a secondary transfer position where the toner image is to be transferred from the intermediate transfer belt onto an image recording medium.

6. The image forming method according to claim 5, wherein the zinc-containing metal soap is a mixture of zinc stearate and zinc palmitate.

7. The image forming method according to claim 6, wherein a mixing ratio of the zinc stearate to the zinc palmitate is from 73/27 to 45/55.

8. The image forming method according to claim 5, wherein the intermediate transfer belt has linear convexities on its surface, the linear convexities having a height of from 0.01 to 1 μm and a width of from 0.5 to 5 μm.

9. The image forming method according to claim 8, wherein the linear convexities divide the surface of the intermediate transfer belt into multiple regions, and each of the regions defined by the linear convexities has an area of from 1,000 to 30,000 $\mu m^2$.

10. An image forming method, comprising:

applying a zinc-containing metal soap to a surface of an intermediate transfer belt that already has nitrogen on said surface thereof to satisfy the following formulae:

$$(F/E)\times 100(\%)\leq 30(\%)$$

$$(1-C/D)\times 100(\%)-(B/A)\times 100(\%)\leq 10(\%)$$

wherein E (% by atom) and F (% by atom) represent a percentage content of nitrogen at the surface of the intermediate transfer belt before and after application of the metal soap thereto for 5 minutes without image formation, respectively, measured by X-ray photoelectron spectroscopy (XPS), and wherein A (% by atom) and B (% by atom) represent a percentage content of nitrogen at the surface of the intermediate transfer belt before and after image formation on 1,000 sheets, respectively, measured by XPS, C (% by atom) represents a percentage content of zinc at the surface of the intermediate transfer belt after the image formation on 1,000 sheets, measured by XPS, and D (% by atom) represents a percentage content of zinc based on all elements other than hydrogen in the zinc-containing metal soap before the image formation on 1,000 sheets; and utilizing the intermediate transfer belt, to which the zinc-containing metal soap has been applied, in an image forming operation in an image forming apparatus or an intermediate transfer device, wherein the zinc-containing metal soap is applied to the intermediate transfer belt upstream from a primary transfer position where a toner image is to be transferred from a photoreceptor onto the intermediate transfer belt and downstream from a secondary transfer position where the toner image is to be transferred from the intermediate transfer belt onto paper.

11. The image forming method according to claim 10, wherein the following formulae are satisfied:

$$(B/A)\times 100(\%)\leq 30(\%)$$

$$(1-C/D)\times 100(\%)\leq 30(\%).$$

12. The image forming method according to claim 10, wherein the zinc-containing metal soap is a mixture of zinc stearate and zinc palmitate.

13. The image forming method according to claim 12, wherein a mixing ratio of the zinc stearate to the zinc palmitate is from 73/27 to 45/55.

14. The image forming method according to claim 10, wherein the intermediate transfer belt has linear convexities on its surface, the linear convexities having a height of from 0.01 to 1 μm and a width of from 0.5 to 5 μm.

15. The image forming method according to claim 14, wherein the linear convexities divide the surface of the intermediate transfer belt into multiple regions, and each of the regions defined by the linear convexities has an area of from 1,000 to 30,000 $\mu m^2$.

* * * * *